United States Patent [19]
Miyazawa et al.

[11] Patent Number: 5,574,926
[45] Date of Patent: Nov. 12, 1996

[54] ONE-CHIP MICROCOMPUTER SYSTEM HAVING FUNCTION FOR SUBSTANTIALLY CORRECTING CONTENTS OF PROGRAM

[75] Inventors: Azuma Miyazawa; Junichi Itoh; Yuji Imai; Minoru Hara; Kazutada Kobayashi; Shoji Kawamura; Kenji Fujibayashi, all of Tokyo; Yuichi Saito, Sagamihara; Yoichiro Okumura, Tokyo, all of Japan

[73] Assignee: Olympus Optical Co., Ltd., Tokyo, Japan

[21] Appl. No.: 209,834

[22] Filed: Mar. 11, 1994

[30] Foreign Application Priority Data

| Mar. 11, 1993 | [JP] | Japan | 5-051112 |
| Mar. 12, 1993 | [JP] | Japan | 5-051752 |
| Mar. 12, 1993 | [JP] | Japan | 5-051753 |

[51] Int. Cl.$^6$ .......................... G06F 15/78; G06F 19/00; G06F 9/06
[52] U.S. Cl. .................. 395/800; 395/430; 395/442; 395/182.05; 364/957.8
[58] Field of Search .................. 395/800, 375, 395/430, 442, 412, 182.04, 182.05, 182.06; 364/246.11, 957.8

[56] References Cited

U.S. PATENT DOCUMENTS

| 3,748,653 | 7/1973 | Debruyne et al. |
| 4,542,453 | 9/1985 | Patrick et al. .................. 395/375 |
| 4,580,212 | 4/1986 | Hosaka . |
| 4,610,000 | 9/1986 | Lee .................. 364/DIG. 1 |
| 4,713,812 | 12/1987 | Arnold et al. .................. 395/182.05 |
| 4,736,290 | 4/1988 | McCallion .................. 395/412 |
| 4,802,119 | 1/1989 | Heene et al. |
| 5,040,016 | 8/1991 | Ishikawa et al. |
| 5,051,897 | 9/1991 | Yamaguchi et al. |
| 5,357,627 | 10/1994 | Miyazawa et al. .................. 395/182.04 |
| 5,371,869 | 12/1994 | Lee .................. 364/DIG. 1 |

FOREIGN PATENT DOCUMENTS

| 0 514 806 | 11/1992 | European Pat. Off. |
| 2-941 | 1/1900 | Japan . |
| 62-52635 | 3/1987 | Japan . |
| 1204550 | 8/1989 | Japan . |
| 3-186927 | 8/1991 | Japan . |

OTHER PUBLICATIONS

Correy, R. M.; "Read–Only Store Patch"; IBM Technical Disclosure Bulletin; vol. 16, No. 12, pp. 3841–3842; May 1974.

Quinn, R. L.; "Modification of Programs in Read–Only Storage"; IBM Technical Disclosure Bulletin; vol. 19, No. 3, pp. 1066–1067; Aug. 1976.

Primary Examiner—Alyssa H. Bowler
Assistant Examiner—Mark H. Rinehart
Attorney, Agent, or Firm—Frishauf, Holtz, Goodman, Langer & Chick

[57] ABSTRACT

A one-chip microcomputer system includes a one-chip microcomputer, a nonvolatile memory which can electrically rewritably store changing data of a program stored in a mask ROM of the one-chip microcomputer, an input unit (connection unit) for receiving data to be written in the nonvolatile memory from an external device, and an object to be controlled by the one-chip microcomputer. In one aspect, the nonvolatile memory has first and second correction data areas, and first and second memories for respectively designating these areas. Upon reception of an initialization signal from the external device connected to the input unit, only the second memory for designating the second correction data area is initialized. In another aspect, the mask ROM stores ROM version data, and the nonvolatile memory stores board version data. Upon writing of the data via the input unit, bug correction data is selected based on the ROM version data and the board version data, and the selected data is written in the nonvolatile memory. In still another aspect, the nonvolatile memory has a first area for storing data for correcting a bug in the program, a second area for storing data for changing a specification of the object to be controlled, and a third area for determining whether or not data are stored in the first and second areas.

8 Claims, 22 Drawing Sheets

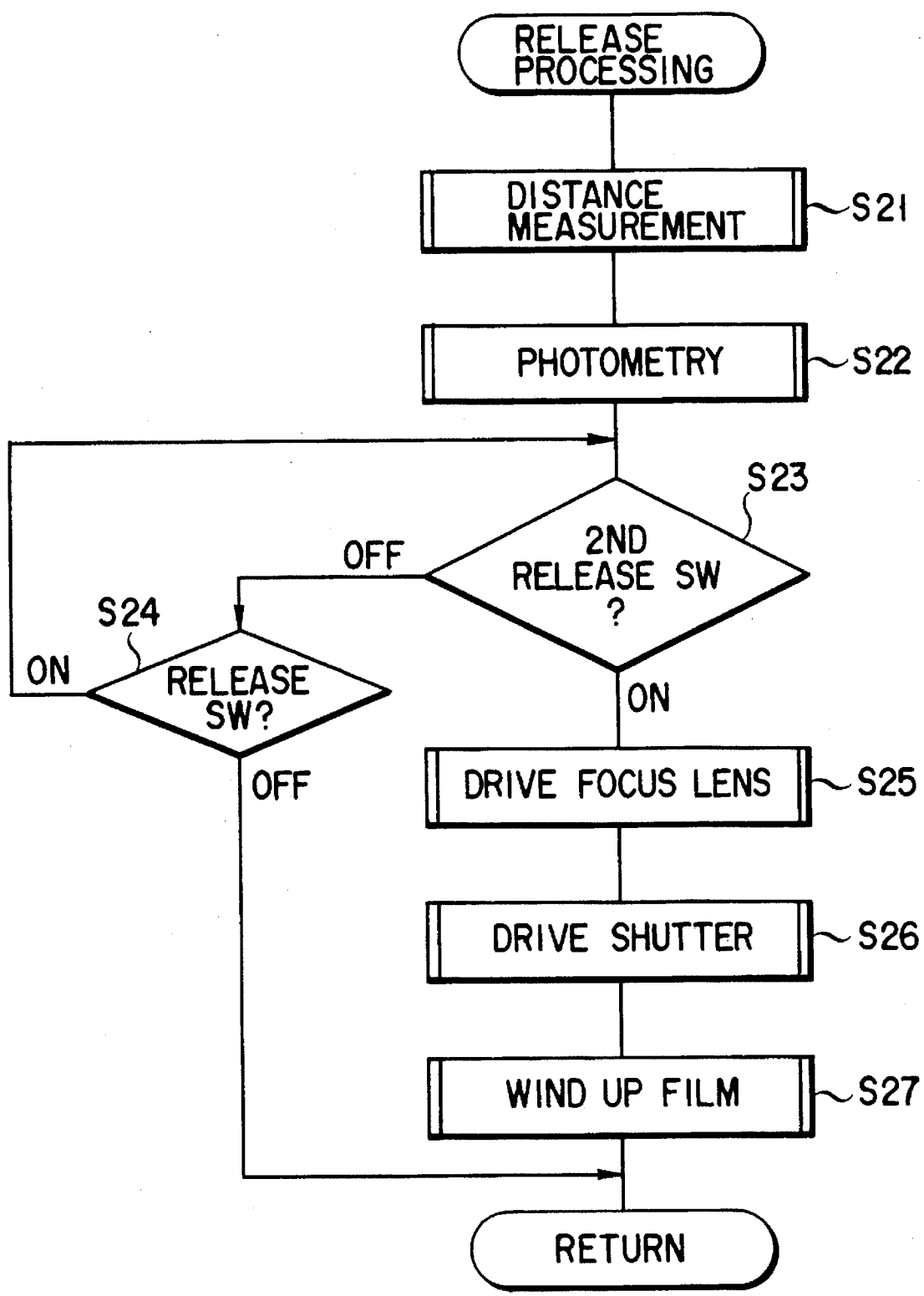
F I G. 4

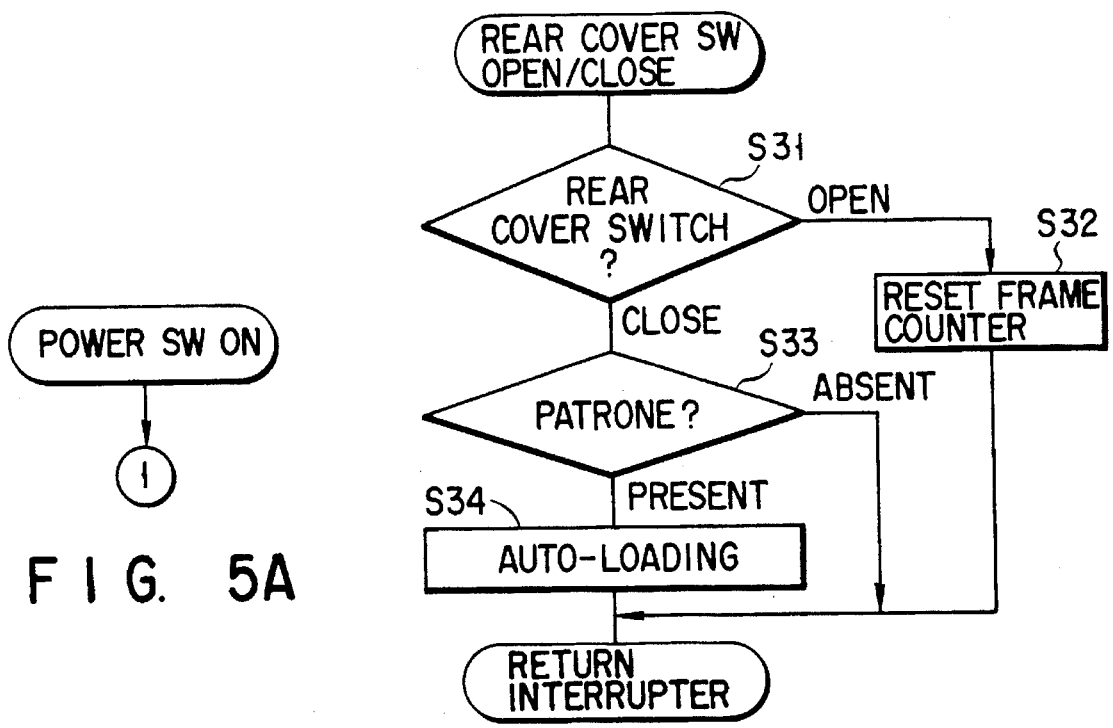
FIG. 5A
FIG. 5B
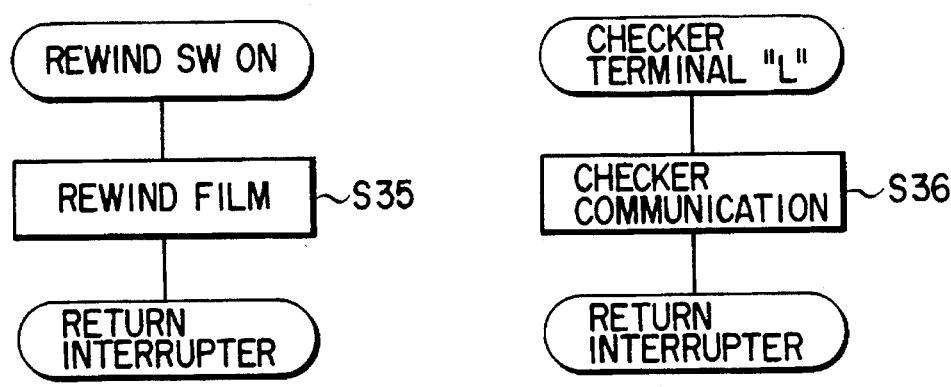
FIG. 5C
FIG. 5D

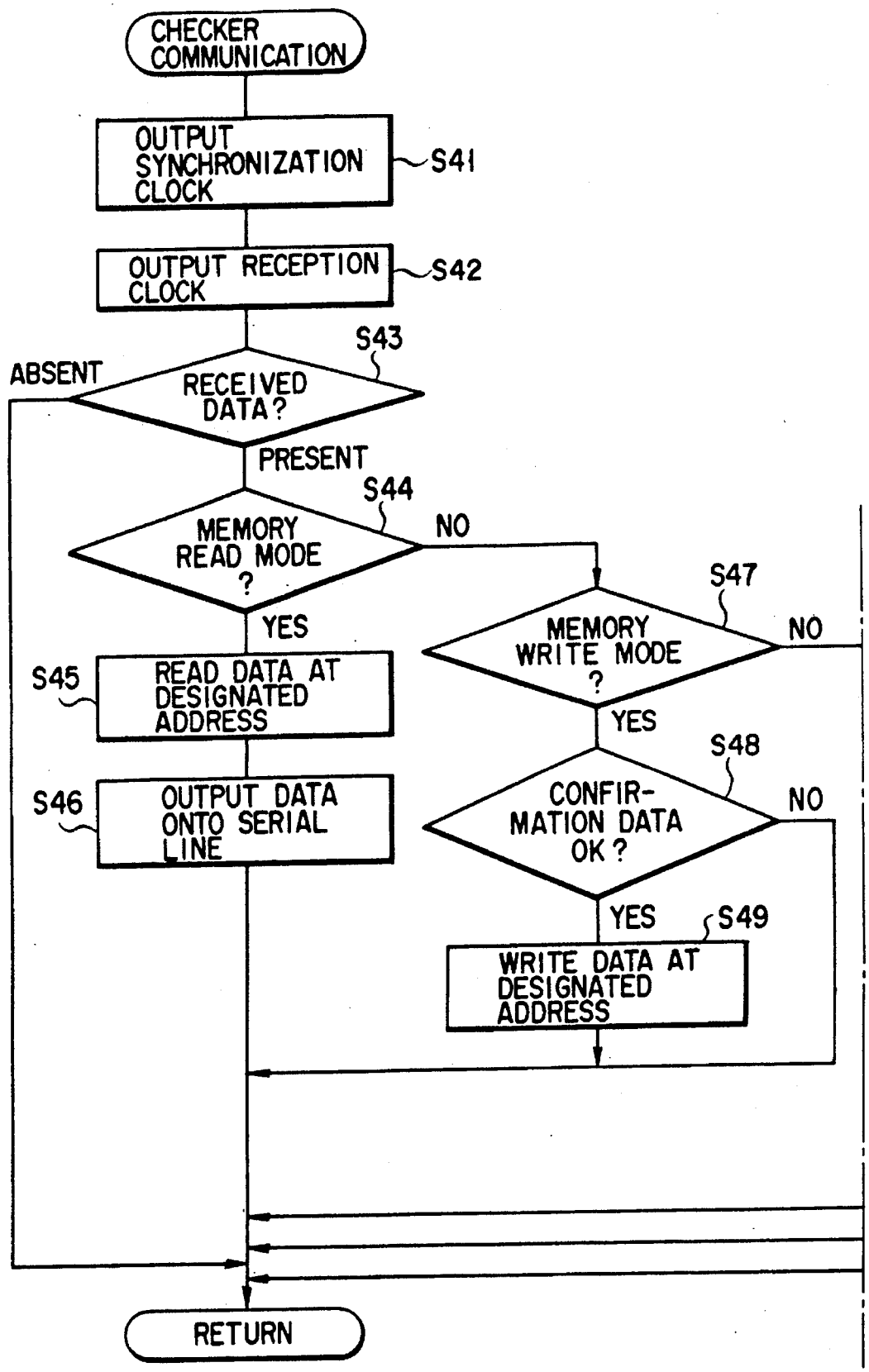
F I G. 6A

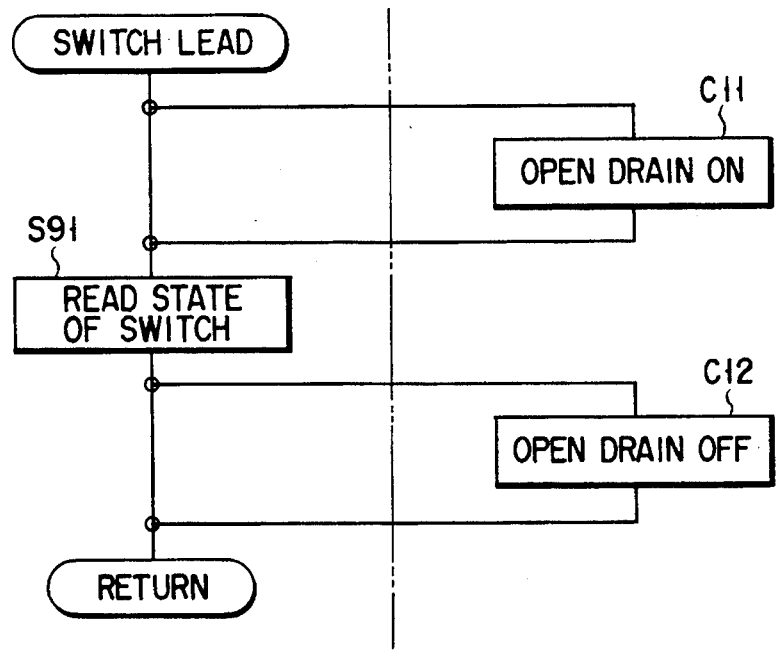
F I G. 16
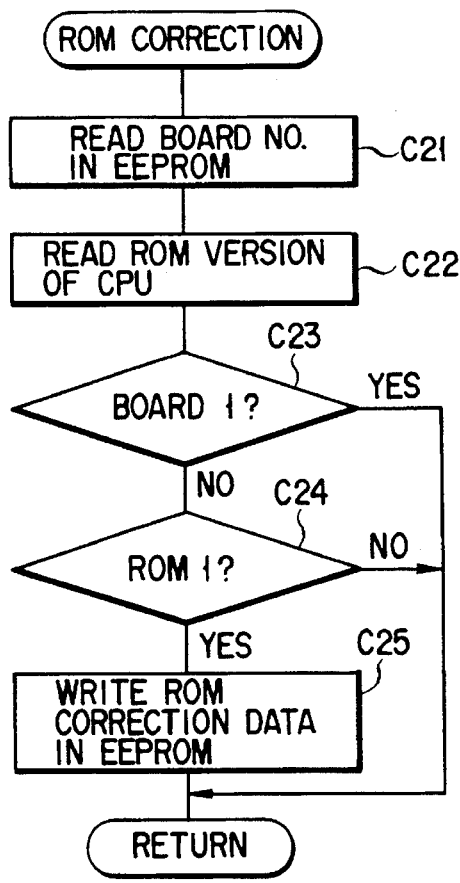
F I G. 17

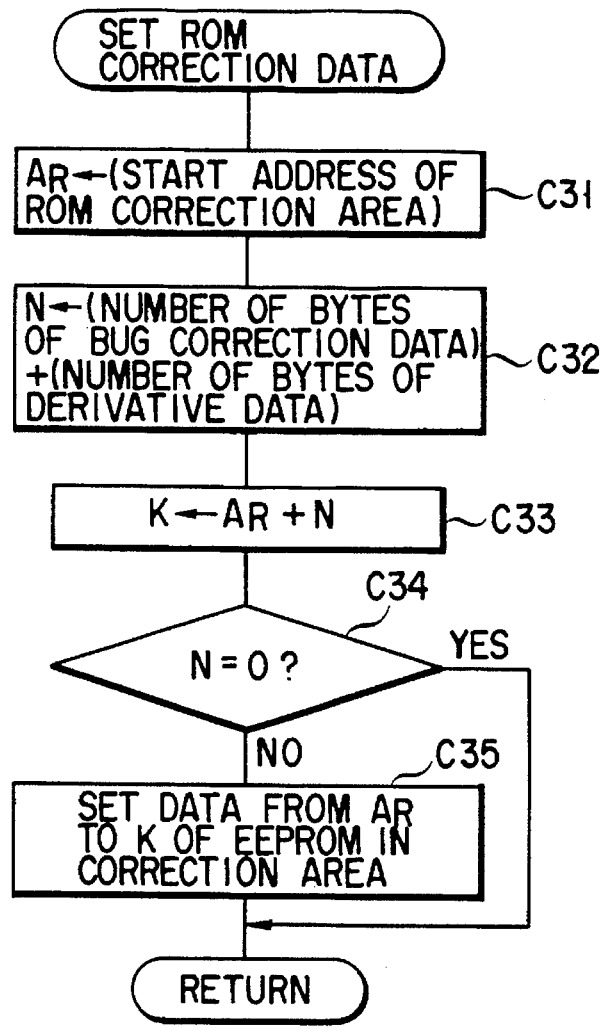
F I G. 19
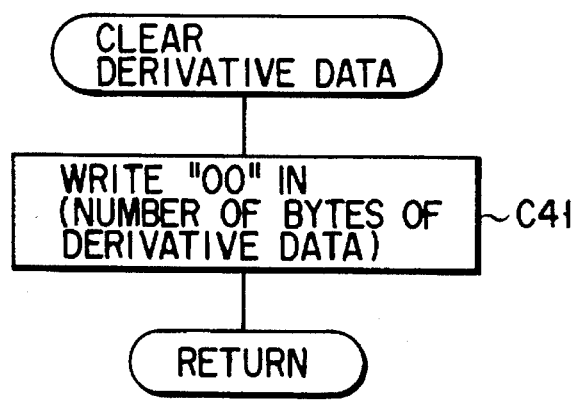
F I G. 20

ONE-CHIP MICROCOMPUTER SYSTEM HAVING FUNCTION FOR SUBSTANTIALLY CORRECTING CONTENTS OF PROGRAM

BACKGROUND OF THE INVENTION

1. Field of the Invention

The present invention generally relates to a one-chip microcomputer system and, more particularly, to a one-chip microcomputer system having a function of substantially correcting the contents of a program written in a mask type read-only memory (mask ROM) incorporated in a one-chip microcomputer used as a controller for controlling an object to be controlled such as a camera.

2. Description of the Related Art

Recent cameras are designed to operate according to a program written in mask type read-only memory (mask ROM) incorporated in a one-chip microcomputer (one-chip CPU). Such a program is created to achieve optimal operations in combinations with various accessaries, which are conceivable at the stage of system design of a camera.

A camera of this type sequentially processes a program from the initial address of the mask ROM upon power-ON reset, and finally stops in a low power consumption mode. In a series of processing operations, the program cannot be stopped at a desired address by an external apparatus, or the state of progress in processing, i.e., the value of a program counter, the value of a random-access memory (RAM), and the like, which are incorporated in the one-chip CPU, cannot be checked by an external apparatus.

In the above-mentioned conventional camera system having the one-chip CPU, the program of the camera system includes programs corresponding to all accessaries available at the time of system design. However, some customers may request to rewrite the program created upon system design of the camera.

The mask ROM comprises a correction area for erroneous operation prevention, and an optional correction area. Upon rewriting of the program, the correction area for erroneous operation prevention may be erroneously deleted.

For this reason, Jpn. Pat. Appln. KOKAI Publication No. 3-186927 discloses a technique associated with program correction of a system comprising a CPU which allows program correction so as to prevent a correction area for erroneous operation prevention from being erroneously deleted.

However, according to the technique of this prior art, although the correction area for erroneous operation prevention can be prevented from being deleted, it is not easy to delete only an optional correction area which is used for changing specifications.

When a countermeasure against a drawback, which is not expected upon system design, is taken in the manufacturing process of a product as a camera system, the specifications of an electric circuit board which mounts a one-chip CPU, and other components are changed accordingly.

In this case, before the versions of components are revised upon the change in specification, a countermeasure is taken using components which are used before the change was made. For this reason, it is difficult to discriminate by visually observing components if a product is a corrected or non-corrected one. Therefore, whether or not a countermeasure must be taken in a production line cannot often be discriminated.

In this case, since program correction itself can be performed by a microcomputer by the technique disclosed in Jpn. Pat. Appln. KOKAI Publication No. 3-186927 above, the above-mentioned countermeasure against the drawback can be taken.

However, a method of distinguishing a corrected microcomputer, which is corrected by the above-mentioned program correction, from a non-corrected one even after the ROM of the microcomputer is corrected is not described. Therefore, a production line or a repair shop is confused by such a microcomputer, and it is difficult for them to discriminate whether or not the product has undergone correction as the countermeasure against the drawback, resulting in difficult management of products.

Furthermore, the recent remarkable technical innovations may realize an accessary having a new function, which was not conceivable upon design of the camera system. Also, after a program of the camera system is created, the program may be required to be partially corrected.

In this case, since the conventional camera system cannot cope with such an accessary having a new function, if a user who possesses the old camera system wants to use the accessary having the new function, he or she must purchase a new camera system. Also, in order to partially correct the program, the entire one-chip microcomputer must be redesigned.

For this reason, for example, U.S. Pat. No. 5,040,016 etc. disclose a camera system which can change a mode or can add a function by inserting a card in a camera main body.

However, in such a camera system, programs corresponding to all cards are prepared in advance, and a program matching with the inserted card can only be selected. For this reason, all modes must be determined upon design of the camera system, and the camera system cannot be checked by a non-programmed function or address after the product is completed.

SUMMARY OF THE INVENTION

It is, therefore, an object of the present invention to provide a new and improved one-chip microcomputer system which can easily and substantially correct contents of a program.

It is another object of the present invention to provide a control system which allows a customer to easily delete only an optional correction area.

It is still another object of the present invention to provide a correction data write apparatus for a system having a one-chip microcomputer, which apparatus can automatically discriminate a microcomputer incorporating a corrected ROM from a non-corrected microcomputer, and allows easy management without confusing a production line or a repair shop.

It is still another object of the present invention to provide a control system which can satisfy a user's requirement for a change in specification, which cannot be predicted in advance upon system design.

According to an aspect of the present invention, there is provided a one-chip microcomputer system comprising a one-chip microcomputer comprising a one-chip microcomputer main body, data input means for receiving correction data, a mask ROM for storing ROM version data and program contents for control by the one-chip microcomputer main body, and substantial changing means for substantially changing the program contents stored in said mask ROM on the basis of the correction data received via the data input means, an object to be controlled by the one-chip microcomputer, and a nonvolatile memory arranged outside said one-chip microcomputer, the nonvolatile memory having a first correction data storage area for storing the correction data for correcting a bug in the program stored in the mask ROM, and a second correction data storage area for storing correction data for adding or changing a function to the one-chip microcomputer system in accordance with a user's request, wherein the one-chip microcomputer reads out the ROM version data stored in the mask ROM and writes correction data matching with the readout ROM version data in the nonvolatile memory, while the one-chip microcomputer also reads out the correction data written in said nonvolatile memory via the data input means and substantially changes the program contents.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a flow chart showing a subroutine for explaining the operation of "release processing";

FIGS. 5A, 5B, 5C, and 5D are flow charts showing first to fourth interrupt processing operations;

FIGS. 6A and 6B are flow charts showing a subroutine for explaining the operation of "checker communication";

FIG. 16 is a flow chart for explaining the processing operation by permanent countermeasures when the combinations of the circuit boards and CPUs shown in FIGS. 15A to 15C cause troubles;

FIG. 17 is a flow chart showing write discrimination processing of ROM correction data;

FIG. 19 is a flow chart showing a subroutine for setting ROM correction data for bug correction and derivative in a microcomputer;

FIG. 20 is a flow chart showing a subroutine which is used in, e.g., a repair shop, when a user wants to restore the mode from a derivative mode to a standard mode;

DETAILED DESCRIPTION OF THE PREFERRED EMBODIMENTS

Figure 1:
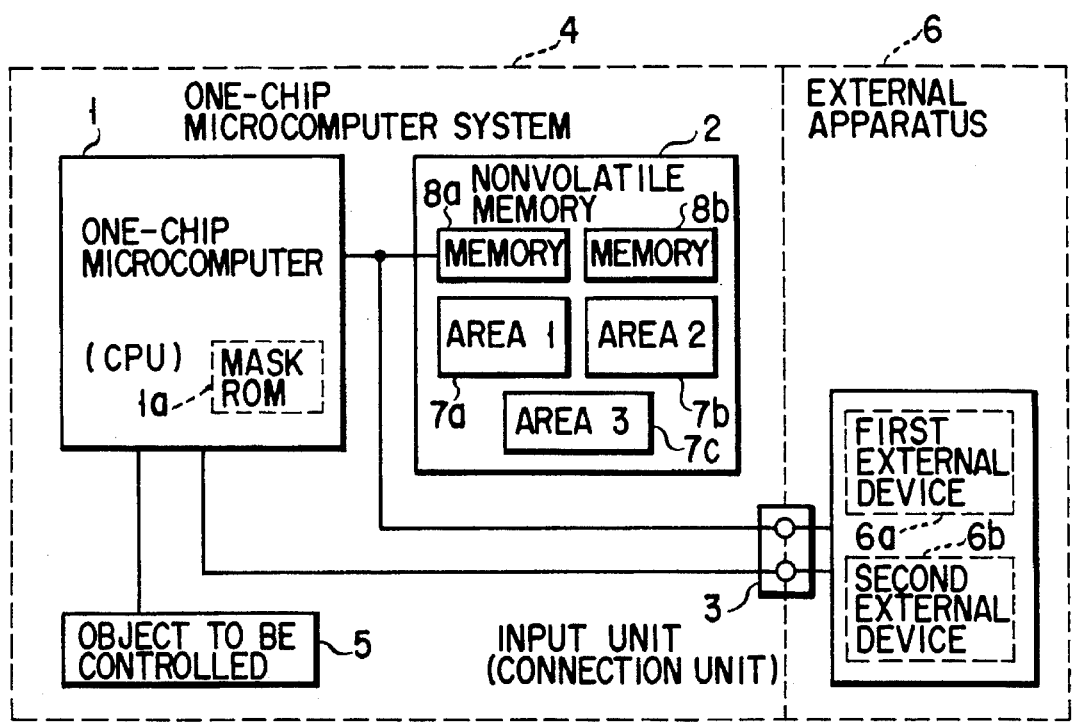
FIG. 1 is a block diagram showing the basic arrangement of a control system according to the first embodiment of the present invention.

Reference will be made in detail to the presently preferred embodiments of the invention as illustrated in the accompanying drawings, in which like reference characters designate like or corresponding parts throughout the several drawings.

The outline of the present invention will be described below with reference to FIG. 1.

According an aspect of the present invention, in a one-chip microcomputer system 4 which comprises a one-chip microcomputer 1 having a function of substantially correcting the contents of a program stored in an internal mask ROM 1a, a nonvolatile memory 2 which is connected to the one-chip microcomputer 1, and can electrically rewrite correction data of the program, an input unit 3 for receiving data to be written in the nonvolatile memory 2 from an external apparatus 6, and an object 5 to be controlled by the one-chip microcomputer 1, the nonvolatile memory 2 has a first correction data area 7a, a second correction data area 7b, and memories 8a and 8b for respectively designating these areas, and initializes only the memory 8b for designating the second correction data area 7b when an initialization signal is supplied from the external apparatus 6 including first and second external devices 6a and 6b which are selectively connected to the input unit 3.

According to another aspect of the present invention, in a one-chip microcomputer system 4 which comprises a one-chip microcomputer 1 having a function of substantially correcting the contents of a program stored in an internal mask ROM 1a, an electrically rewritable nonvolatile memory 2 which is connected to the one-chip microcomputer 1, and can store at least data for correcting a bug of the program, a connection unit 3 used for externally writing data in the nonvolatile memory 2, and an object 5 to be controlled by the one-chip microcomputer 1, the mask ROM 1a stores ROM version data, the nonvolatile memory stores board version data, and when the data is written via the connection means, the bug correction data is selected on the basis of the ROM version data and the board version data, and is written in the nonvolatile memory 2.

Furthermore, according to still another aspect of the present invention, in a one-chip microcomputer system 4 which comprises a one-chip microcomputer 1 having a function of substantially correcting the contents of a program stored in an internal mask ROM 1a, an electrically rewritable nonvolatile memory 2 which is connected to the one-chip microcomputer 1, and has a first area 7a for storing data for correcting a bug of the program, a second area 7b for storing data for changing specifications of an object 5 to be controlled, and a third area 7c used for discriminating whether or not data are stored in the first and second areas, a connection unit 3 used for externally writing data in the nonvolatile memory 2, and an object 5 to be controlled by the one-chip microcomputer 1, the microcomputer 1 substantially changes the contents of the program in accordance with data stored in the first and second areas 7a and 7b, thereby controlling the object 5 to be controlled.

An embodiment of the present invention will be described below with reference to the accompanying drawings.

Figure 2:
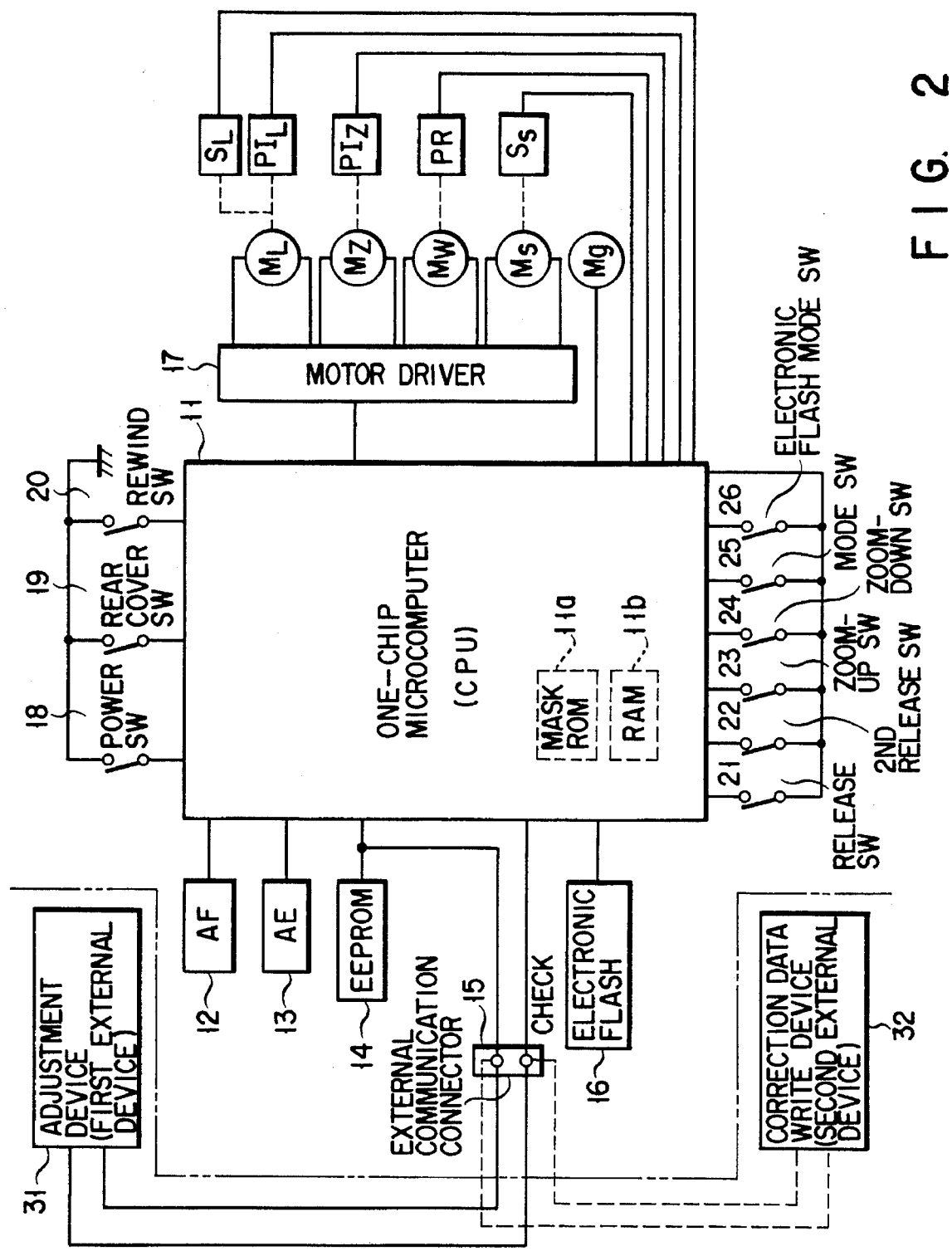
FIG. 2 is a block diagram showing a camera system to which the first embodiment of the present invention is applied.

FIG. 2 is a block diagram showing a camera system to which a control system according to the present invention is applied.

Referring to FIG. 2, reference numeral 11 denotes a one-chip microcomputer (to be abbreviated as a CPU hereinafter) for executing sequence control of the camera system. The CPU 11 has a function of substantially changing the contents of an internal mask ROM (to be simply referred to as a ROM hereinafter) 11a which stores control program data. The CPU 11 is connected to an auto-focusing (AF) circuit 12 for measuring the distance to an object, an auto-exposure (AE) circuit 13 for measuring the brightness of an object, an electrically rewritable nonvolatile memory (EEPROM) 14 for storing adjustment values and ROM correction data of the camera system, an external communication connector 15 for connecting a camera adjustment device (first external device) 31 and a correction data write device (second external device) 32 for writing ROM correction data, and an electronic flash 16 for performing an electronic flash charging operation and light emission.

The external communication connector 15 may be a conductor pattern formed on an electrical circuit (printed circuit) board (not shown) which mounts the CPU 11.

The first and second external devices 31 and 32 are connected to the external communication connector 15 only when the camera system is to be adjusted or ROM correction data (to be described later) is written. The first external device 31 is used in assembling/adjustment of the camera system in a factory. The second external device 32 is used when a derivative mode (to be described later) is written in repair of the camera system in, e.g., a repair shop.

In FIG. 2, the EEPROM 14 is located outside the CPU 11. Needless to say, in this embodiment, the CPU which incorporates the EEPROM is used.

The CPU 11 is connected, via a motor driver 17 for driving various motors, a motor $M_L$ for driving a focus lens, a motor $M_Z$ for driving a zoom lens, a motor $M_W$ for winding/rewinding a film, a motor $M_S$ for driving a shutter, and a magnet Mg for closing the shutter. Also, the CPU 11 is connected to a switch $S_L$ for detecting the initial position of the focus lens, a photointerrupter $PI_L$ for detecting the unit driving amount (position) of the focus lens, a photointerrupter $PI_Z$ for detecting the position of the zoom lens, a photoreflector PR for detecting perforations of a film, and a switch $S_S$ for detecting the initial position of the shutter.

Furthermore, the CPU 11 is connected to various switches, i.e., a power switch 18, a rear cover switch 19, a rewind switch 20, a release switch 21, a second (2nd) release switch 22, a zoom-up switch 23, a zoom-down switch 24, a mode select switch 25, and an electronic flash mode switch 26. Note that the release switch 21 and the 2nd release switch 22 constitute a two-stroke switch. That is, the release switch 21 is turned on at the first stroke position, and the 2nd release switch 22 is turned on at the second stroke position.

Figure 3:
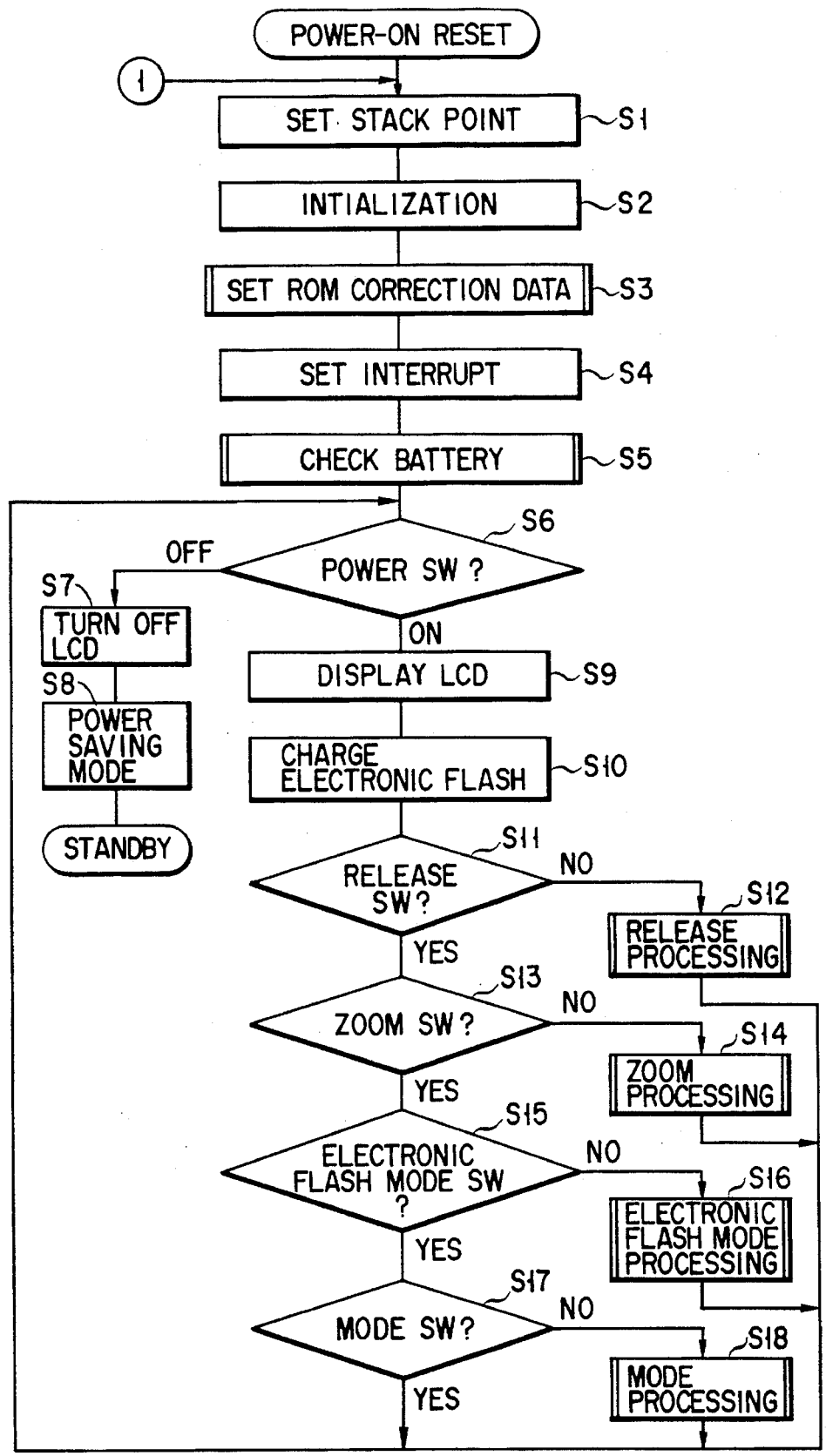
FIG. 3 is a main flow chart for explaining the operation of the entire camera system shown in FIG. 2.

FIG. 3 is a main flow chart for explaining the operation of the entire camera system. Referring to FIG. 3, when a battery (not shown) is loaded into a camera main body, a power-ON reset operation is performed. In this operation, a stack point of the CPU 11 is set (step S1), and thereafter, ports and registers are initialized (step S2). Then, a "ROM correction data setting" subroutine is executed, and if ROM correction data is required, data is set in the EEPROM 14 (step S3). Thereafter, interrupt modes are set, and required interrupt processing is enabled (step S4). Then, a battery check operation is performed (step S5). If the result of the battery check operation is good, sequence control of the camera system is started.

In the sequence control of the camera system, the power switch 18 is checked (step S6). If the power switch 18 is OFF, a display on a liquid crystal display (LCD; not shown) is turned off (step S7), and a power saving mode is set so that a current is not supplied to ports, and the like (step S8), thus setting the CPU 11 in a standby state. On the other hand, if it is determined in step S6 that the power switch 18 is ON, a display on the LCD is performed (step S9), and then, an electronic flash charging operation is performed (step S10).

Then, the states of the respective switches are discriminated. First, it is checked if the release switch 21 is depressed (step S11). If the release switch 21 is ON, "release processing" is executed (step S12). The states of zoom switches are checked (step S13). If the zoom-up switch 23 or the zoom-down switch 24 is depressed, "zoom processing" is executed (step S14). Then, the state of the electronic flash mode switch 26 is checked (step S15). If the electronic flash mode switch 26 is ON, "electronic flash mode processing" is executed (step S16). Furthermore, if it is determined that the mode switch 25 is ON (step S17), "mode processing" is executed (step S18).

In this manner, the operations in steps S6 to S18 are repeated until the power switch 18 is turned off.

The operation of the "release processing" subroutine will be described below with reference to FIG. 4.

After distance measurement is performed by the AF circuit 12 (step S21), photometry is performed by the AE circuit 13 (step S22). If the 2nd release switch 22 is OFF, the control waits until the switch 22 is turned on (step S23). If the release switch 21 is OFF (step S24), the "release processing" is interrupted, and the flow returns to the main routine.

If it is determined in step S23 that the 2nd release switch 22 is turned on, the focus lens is driven (step S25). Then, the shutter is opened after a focusing operation (step S26), and a film is wound by one frame (step S27), thus ending this release processing.

FIGS. 5A, 5B, 5C, and 5D are flow charts showing interrupt processing operations. In the first interrupt processing shown in FIG. 5A, when the power switch 18 is turned on in a state wherein the power switch 18 is OFF, and the CPU 11 is set in a standby state, an interrupt is generated. Then, the standby state is canceled, and processing is started from step S1 in the main flow chart in FIG. 3.

FIG. 5B is a flow chart of interrupt processing of the rear cover switch 19 as the second interrupt processing. The state of the rear cover switch 19 is checked (step S31). If a rear cover (not shown) of the camera is opened, the number of frames displayed on the LCD is reset (step S32). On the other hand, if the rear cover is closed, whether or not a film patrone (not shown) is loaded is detected (step S33). If a film patrone is detected, a film is fed without executing any photographing operation by "auto-loading" processing (step S34). However, if no film patrone is detected, the "auto-loading" processing is not performed.

FIG. 5C shows interrupt processing of the rewind switch 20 as the third interrupt processing. When the rewind switch 20 is depressed, a film is rewound (step S35).

FIG. 5D shows interrupt processing, as the fourth interrupt processing, executed when a CHECK terminal of the external communication connector goes to "L (low level)".

Since the CHECK terminal is normally set at "H (high level)" by an internal pull-up resistor of the CPU 11, an interrupt is generated only when the CHECK terminal is forcibly set at "L" by an external signal. More specifically, when the CHECK terminal goes to "L", "checker communication" processing is executed (step S36).

Figure 6B:
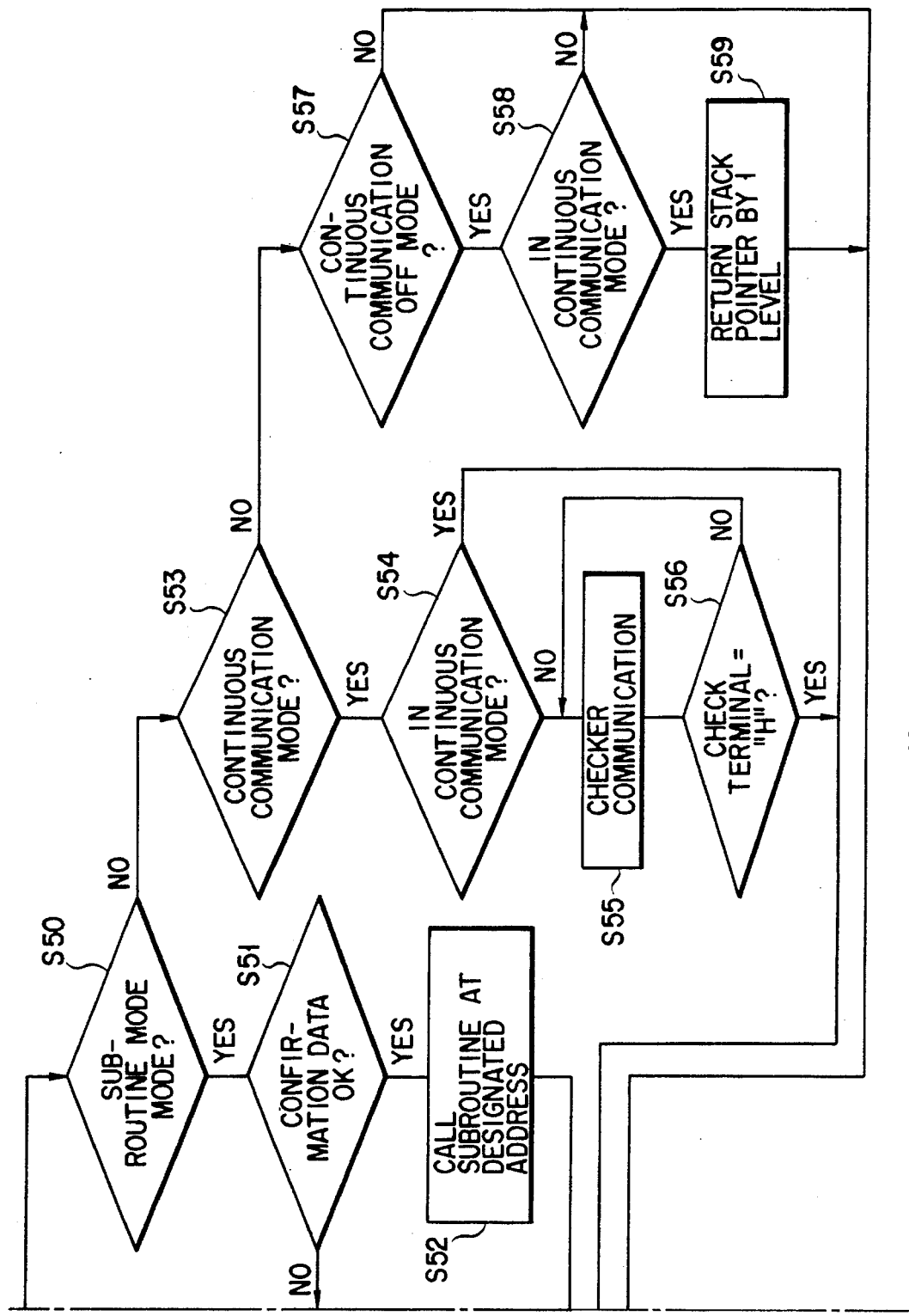

FIGS. 6A and 6B show a subroutine for explaining the "checker communication" operation. This is described in Jpn. Pat. Appln. KOKAI Publication No. 2-941 assigned to the same assignee as the present application. The checker communication is executed as follows.

The CPU 11 outputs a synchronization signal and serial communication clocks to an external device (steps S41 and S42), and receives data from the external device (step S43). In this case, if no data is received, the flow ends. If data is received from the external device, a memory mode is checked (step S44). If the memory mode is a read mode, the contents of the received data are interpreted, and data at the designated address in the CPU 11 is read (step S45). Thereafter, the read data is output onto a serial line (step S46), and the flow returns to the main routine.

If the memory mode is a write mode (step S47), confirmation data is checked (step S48). If the checking result is good, data is written at the designated address (step S49).

If a subroutine call mode is detected (step S50), confirmation data is checked (step S51). If the checking result is good, a subroutine at the designated address is called (step S52) and is executed.

Furthermore, if a continuous communication mode for performing only a communication with the external device is detected (step S53), it is checked if the continuous communication mode is being executed (step S54). If NO in step S54, the checker communication is performed again (step S55). Thereafter, the "checker communication" is performed until the CHECK terminal goes to "H" (step S56).

If an OFF mode for interrupting a continuous communication is detected (step S57), it is checked if the continuous communication mode is being executed (step S58). If YES in step S58, the stack pointer is returned by one level (step S59).

Figure 7:
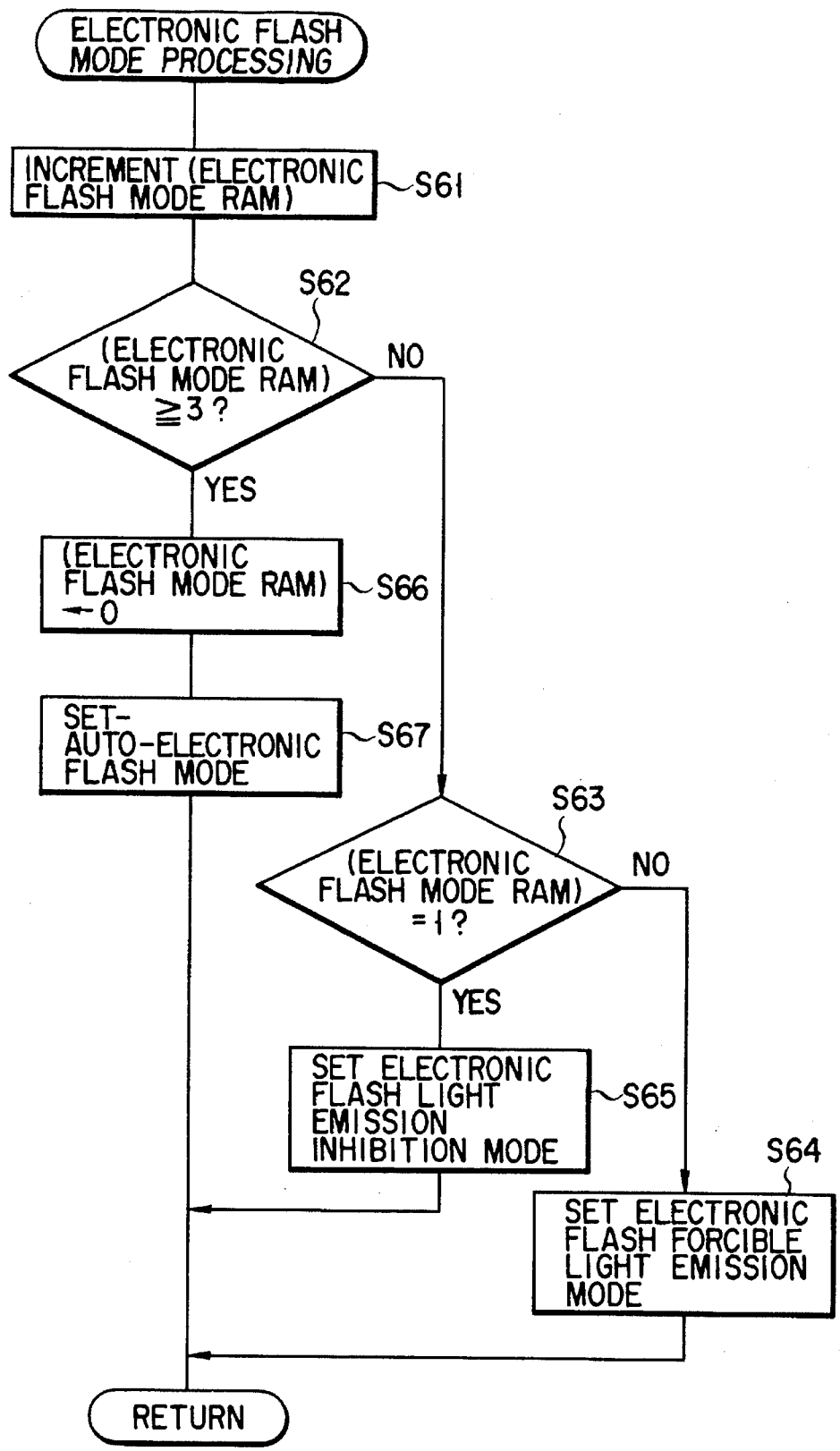
FIG. 7 is a flow chart showing a subroutine for explaining the operation of "electronic flash mode processing"

The "electronic flash mode processing" will be described below with reference to the subroutine in FIG. 7.

Every time the electronic flash mode switch 26 is depressed, the value of an electronic flash mode RAM in a RAM 11b, which is incorporated in the CPU 11 as a memory for the electronic flash mode switch 26, is incremented (step S61). Then, the value of the electronic flash mode RAM is checked (steps S62 and S63).

If the value of the electronic flash mode RAM 11b is "0", an auto-electronic flash mode is set (step S67). If the value of the electronic flash mode RAM is "1", an electronic flash light emission inhibition mode is set (step S65). Furthermore, if the value of the electronic flash mode RAM 11b is "2", an electronic flash forcible light emission mode is set (step S64).

Since the electronic flash mode RAM uses a value up to "2", when the value of the electronic flash mode RAM becomes "3" or more, it is cleared to "0" (step S66). Then, the auto-electronic flash mode is set (step S67).

Figure 8:
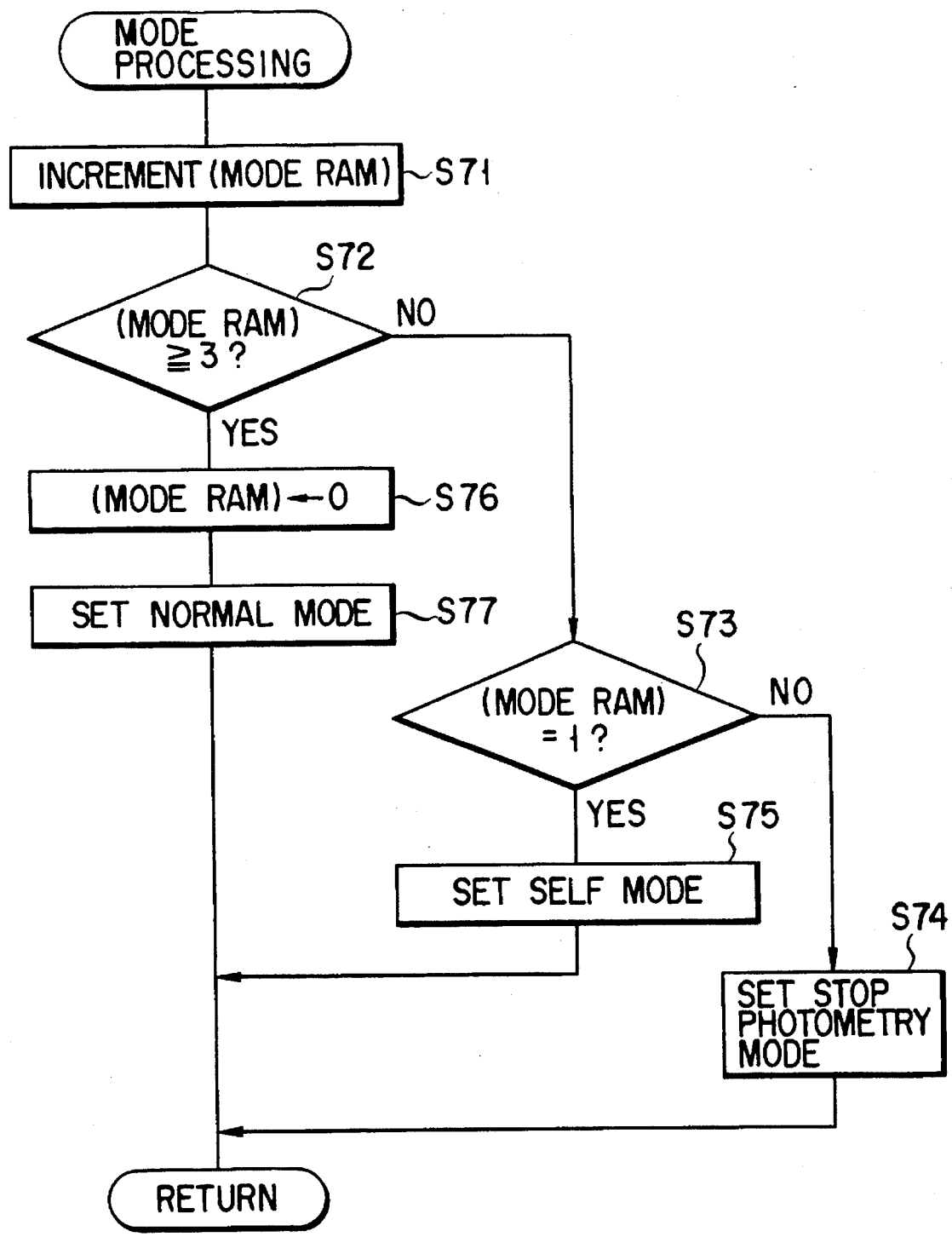
FIG. 8 is a flow chart showing a subroutine for explaining the operation of "mode processing"

FIG. 8 shows the subroutine for explaining the "mode processing" operation.

Every time the mode switch 25 is depressed, the value of a mode RAM in a RAM 11b incorporated in the CPU 11 is incremented (step S71). Then, the value of the mode RAM is checked (steps S72 and S73).

If the value of the mode RAM is "0", a normal mode is set (step S77); if the value of the mode RAM is "1", a self photographing mode is set (step S75); and if the value of the mode RAM is "2", a spot photometry mode is set (step S74).

If the value of the mode RAM is "3" or more, it is reset to "0" (step S76). Thereafter, the normal mode is set (step S77).

The "focus lens driving" processing operation will be described below with reference to the "focus lens driving" subroutine in FIG. 9. First, the focus lens is extended by an amount corresponding to the distance to an object. Assume that the lens extension amount is determined by the number of pulses output from the photointerrupter $PI_L$, which number corresponds to the distance to an object, after the switch $S_L$ is turned off.

A counter is reset (step S81), and the motor $M_L$ is driven (step S82). If it is determined that the switch $S_L$ is turned off (step S83), the count value of the counter is incremented (step S85) every time the output from the photointerrupter $PI_L$ goes to "L" (step S84). If the value of the counter reaches a target value (step S86), the motor $M_L$ is braked (step S87), thus ending processing.

An example of bug correction of this focus lens driving program will be described below. As a bug correction method, two different methods (1) and (2) can be used.

The CPU of the method (1) includes a ROM change memory, a pair of a ROM address to be changed and a change code are stored in the change memory, and when the ROM address coincides with the value of a program counter, the change code is output in place of the corresponding output from the ROM. This corresponds to Jpn. Pat. Appln. KOKAI Publication No. 3-186927 (U.S. patent application Ser. No. 040,562).

In the method (2), when an address to be changed coincides with a count value of a program counter (not shown) in the CPU 11, the control jumps to a specific memory, and corresponding data is corrected. This corresponds to Jpn. Pat. Appln. KOKAI Publication No. 62-52635.

In either of the methods (1) and (2), as described in the reference of the method (1), data to be changed is stored in an EEPROM, and is transferred to the memory immediately after a power-ON reset operation, thereby substantially correcting a program.

The present invention can adopt either of these methods. A memory for storing program change data is not limited to an EEPROM as long as it is a nonvolatile memory, and a flash memory, a PROM, or the like, may be used.

Figure 9:
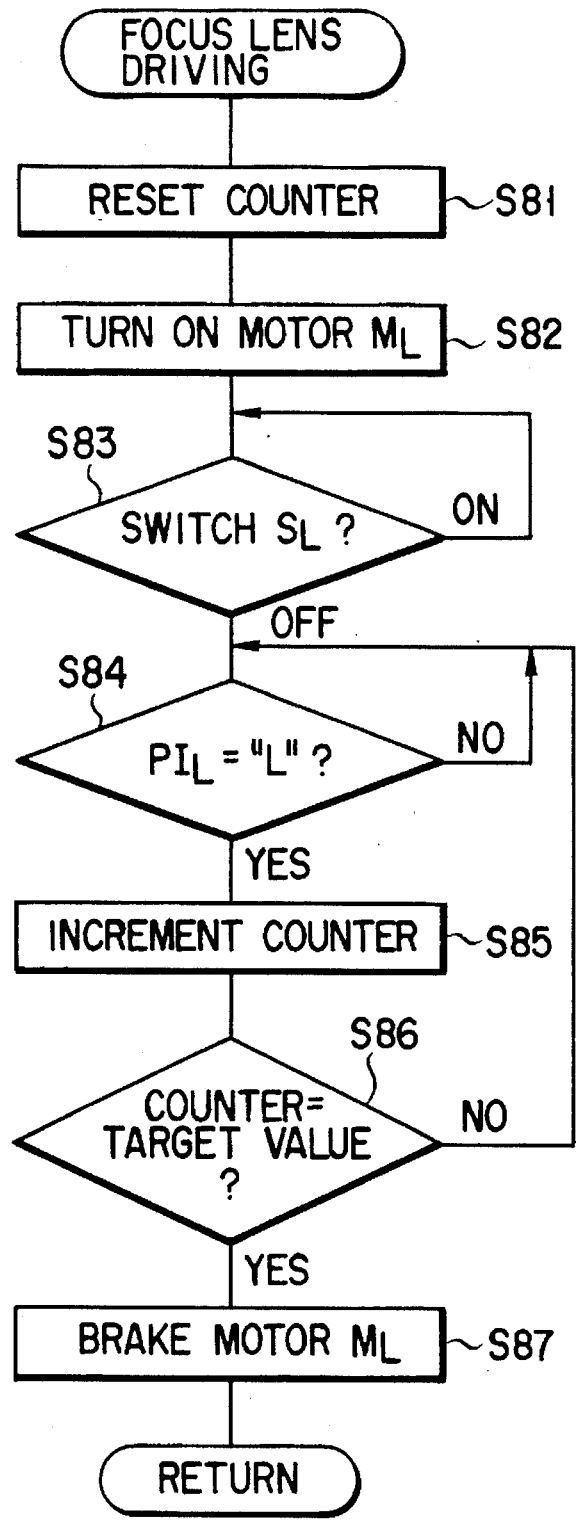
FIG. 9 is a flow chart showing a subroutine for explaining the operation of "focus lens driving"
Figure 10:
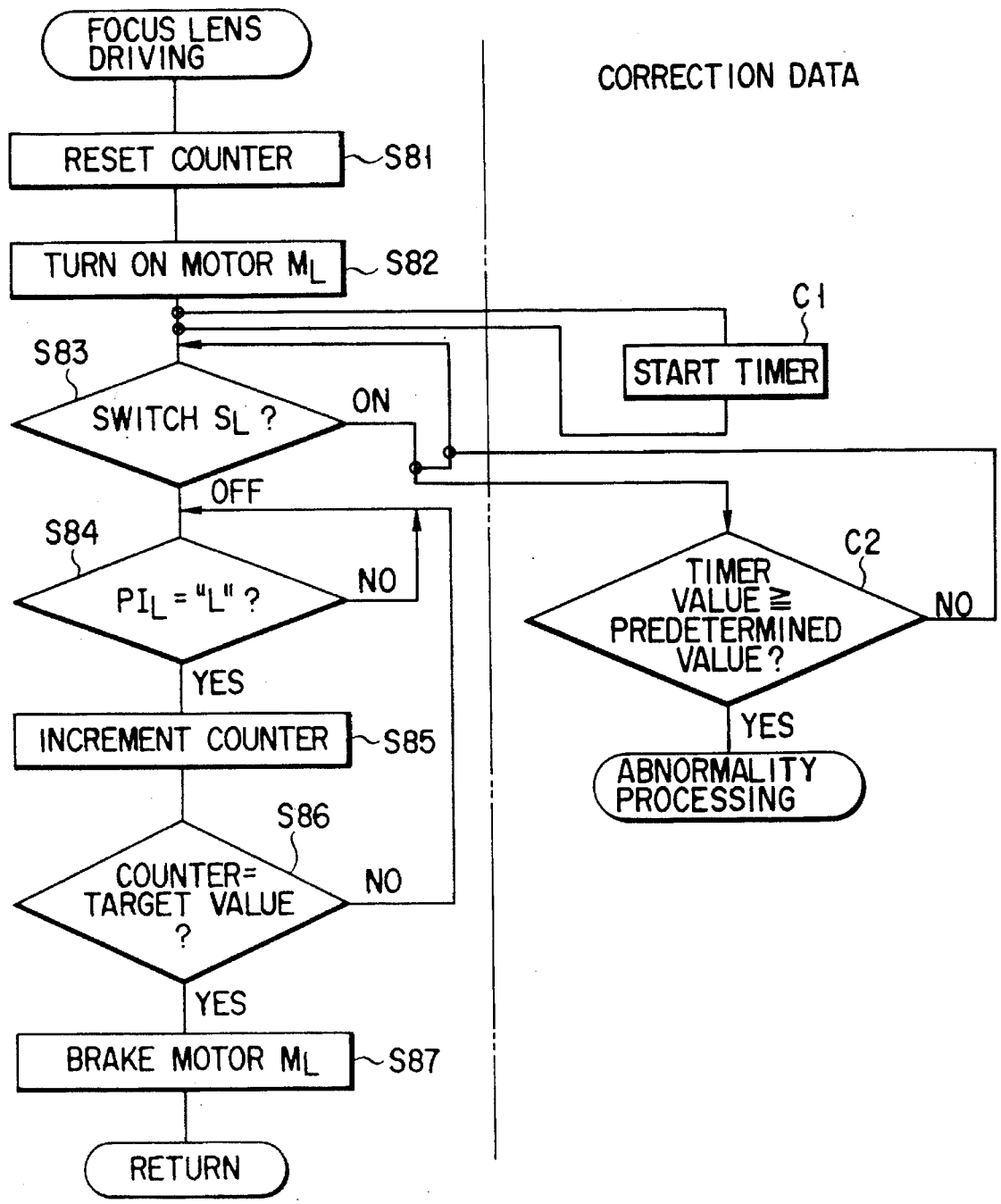
FIG. 10 is a flow chart showing an example of program bug correction of the "focus lens driving" subroutine.

FIG. 10 shows an example of bug correction of the "focus lens driving" program shown in FIG. 9.

The focus lens driving subroutine described above with reference to FIG. 9 includes a bug that the motor cannot be stopped when the focus lens cannot be moved by driving the motor due to a malfunction of the switch $S_L$ or a failure of a mechanism component. Therefore, in a correction method, as shown in correction data, the time until the switch $S_L$ is turned off is limited by a limiter. More specifically, processing for starting a timer (step C1) and processing (step C2) for, when the contents of the timer exceed a predetermined period of time, starting abnormality processing, and stopping the motor $M_L$ are added between steps S82 and S83.

When a system using a CPU whose ROM contents can be corrected is utilized, a camera system having standard specifications can be changed in correspondence with a user's requirement.

A mode selected in correspondence with a user's requirement will be referred to as a derivative mode hereinafter.

Figure 11:
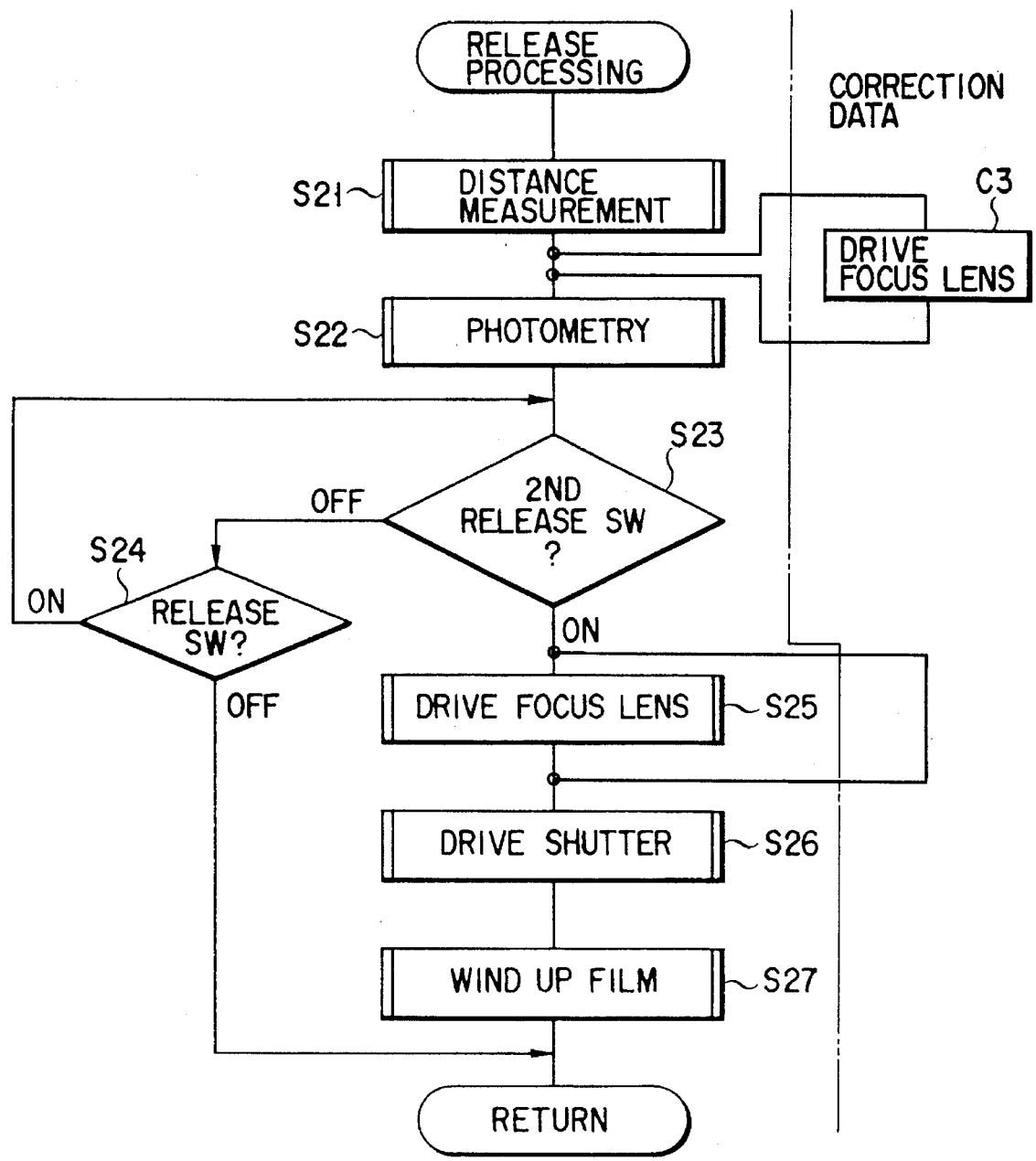
FIG. 11 is a flow chart for explaining the first example of a derivative mode, and showing an example of program bug correction of the "release processing" subroutine shown in FIG. 4.

The first example of the derivative mode will be explained below with reference to FIG. 11.

In the release processing operation described above with reference to FIG. 4, since the focus lens is driven after the 2nd release switch is turned on, a release time lag is prolonged. Thus, the focus lens driving operation is performed (step C3) before the state of the 2nd release switch is checked (step S23), so that the flow skips the focus lens driving operation after the 2nd release switch is turned on.

Figure 12:
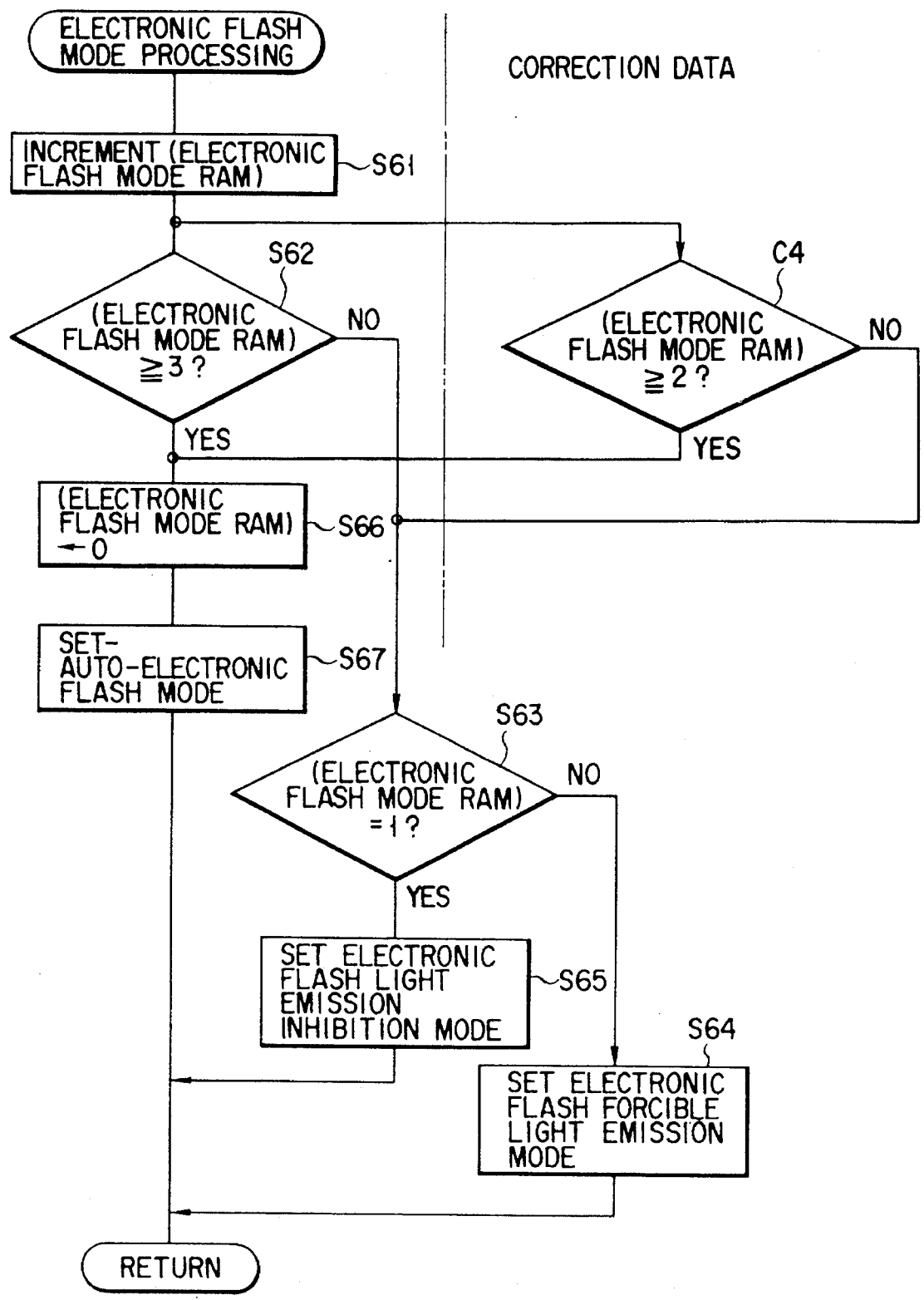
FIG. 12 is a flow chart for explaining the second example of the derivative mode, and showing an example of program bug correction of the "electronic flash mode processing" subroutine shown in FIG. 7.

The second example of the derivative mode will be described below with reference to FIG. 12. In the second example, the value of the electronic flash mode RAM is inhibited from becoming "2" to satisfy a requirement of a user who does not use the electronic flash forcible light emission mode at all.

More specifically, in place of step S62, processing for checking if the value of the electronic flash mode RAM is "2" or more (step C4) is added. If the value of the electronic flash mode RAM is "0" or "1", the flow advances to step S63; if it is "2" or more, the flow advances to step S66.

Figure 13:
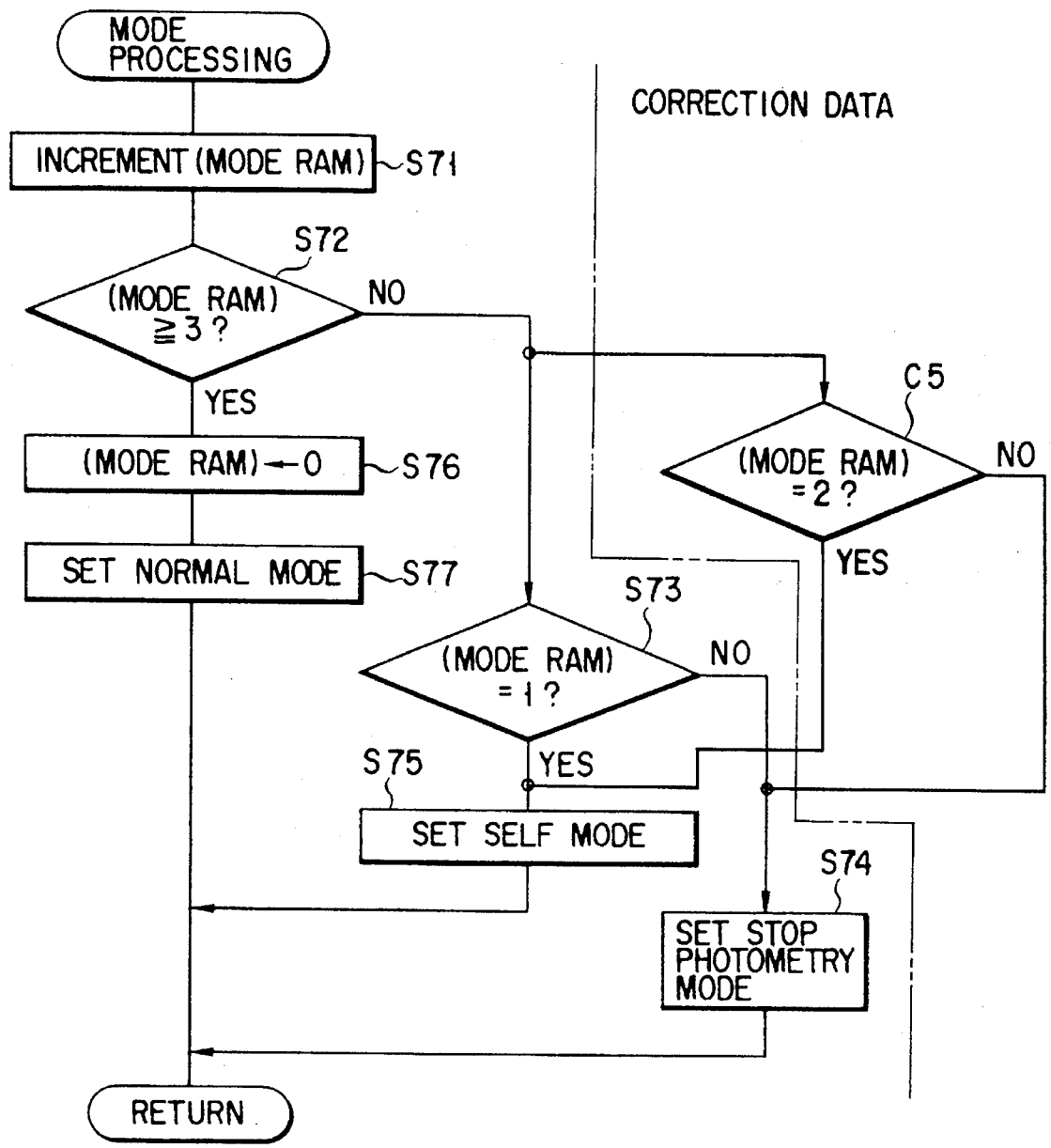
FIG. 13 is a flow chart for explaining the third example of the derivative mode, and showing an example of program bug correction of the "mode processing" subroutine shown in FIG. 8.

FIG. 13 shows the third example of the derivative mode. In this example, the switching order of modes is changed to satisfy a requirement of a user who uses the spot photometry mode more frequently than the self photographing mode.

More specifically, in place of step S73, processing for checking if the value of the mode RAM is "2" (step C5) is added. If the value of the mode RAM is "2", the flow advances to step S75; otherwise, the flow advances to step S74.

Figure 14:
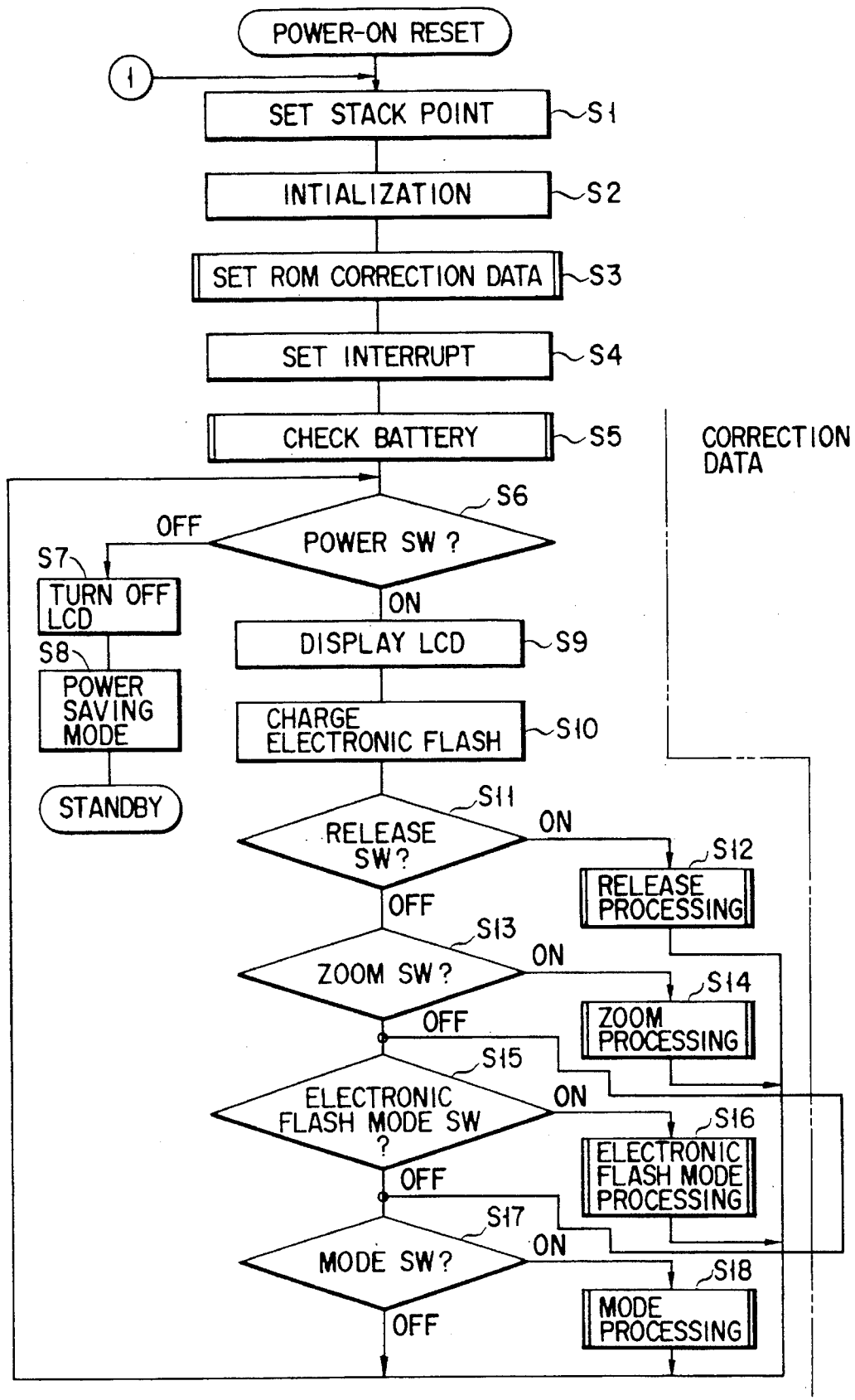
FIG. 14 is a flow chart for explaining the fourth example of a derivative mode, and showing an example of program bug correction of the flow chart shown in FIG. 3.

Furthermore, FIG. 14 shows the fourth example of the derivative mode. In this example, the operation of the electronic flash mode switch 26 is inhibited to satisfy a requirement of a user who uses the electronic flash in only the auto-electronic flash mode.

More specifically, after the processing in step S13, the flow skips steps S15 and S16, and the processing in step S17 is executed.

In addition, the functions of the switches may be changed, or sequences or timings may be changed.

A method of ideally performing production switching when the version of a CPU is changed or the version of a circuit board which mounts the CPU is changed upon detection of a problem in the design will be explained below.

Figure 15A:
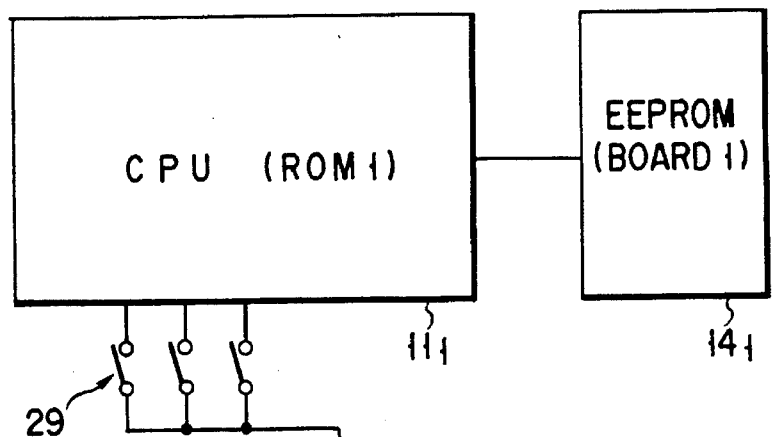
FIGS. 15A, 15B, and 15C are diagrams showing changes and combinations of circuit boards and CPUs.
Figure 15B:
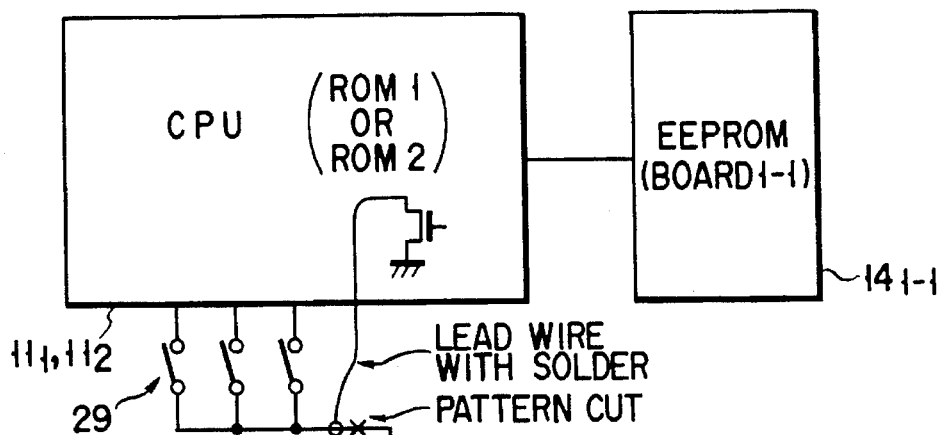
Figure 15C:
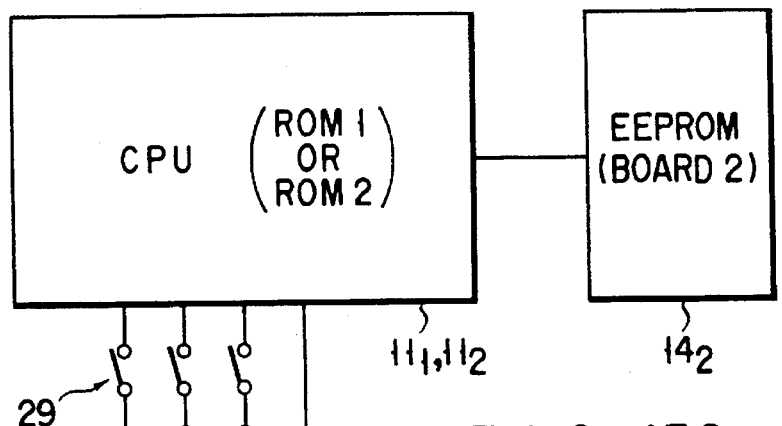

FIGS. 15A, 15B, and 15C show changes and combinations of the circuit boards and CPUs.

FIG. 15A shows an initial state of production. A CPU $11_1$ incorporates an internal ROM 1, and a circuit board 1 is a board or a flexible board on which switch patterns (not shown), an EEPROM, and the like are mounted. The EEPROM stores data indicating the circuit board 1. In this case, one terminal of each of switches 29 is connected to a port having an internal pull-up resistor of the CPU $11_1$, and the other terminal is connected to ground. More specifically, in this method, when one of the switches 29 is turned on, the port connected to the switch 29 is set at "L" level, and the ON switch can be detected.

Normally, this method does not pose any problem. However, when the power supply of, e.g., a camera is a battery, current consumption must be saved as much as possible. For example, if one of the switches 29 is a switch which can be easily depressed, and a camera is kept in a bag, the switch may be kept ON, and the battery may be consumed. In this case, the following permanent countermeasure may be taken. As shown in the flow chart in FIG. 16, the state of each switch 29 is read (step S91). Then, the terminal, at the side of ground, of the switch 29 is connected to an open drain port of the CPU $11_1$, and only when the switch 29 is read, the open drain port is enabled (steps C11 and C12).

However, when such a problem is found after the beginning of production, since components have already been prepared, a countermeasure cannot be quickly taken. When the CPU does not have any ROM correction function, a countermeasure is taken in the following procedure.

(i) Production is started using a combination of the CPU incorporating the ROM 1 and the circuit board 1 (the problem still remains unsolved).

(ii) A CPU incorporating a ROM 2 and a circuit board 2 are designed, and are prepared.

(iii) When the CPU incorporating the ROM 2 becomes available, if a circuit board 1 remains, the board is manually corrected by cutting a pattern as in (ii), and are combined with the CPU incorporating the ROM 2.

(iv) A countermeasure is completed by combining the CPU incorporating the ROM 2 and the circuit board 2.

As described above, strict lot management of ROMs and circuit boards is required. However, in practice, the production must be started while the problem remains unsolved. However, when the CPU $11_1$ having a ROM correction function is used, a countermeasure can be taken as follows.

More specifically, before a problem is found, the production is made according to (i). In this case, a combination of the CPU incorporating the ROM 1 and the circuit board 1 is used. In this case, information indicating the circuit board 1 is stored in an EEPROM $14_1$ under the assumption that a problem may occur.

When a problem is found, a pattern is manually corrected as in (ii) (FIG. 15B). In this case, since the CPU incorporating the ROM 1 is still used, ROM correction data is set in the EEPROM, as shown in FIG. 16. Since the board is manually corrected, information indicating a circuit board 1-1 is stored in an EEPROM $14_{1-1}$. In this case, if a ROM-corrected CPU $11_2$ incorporating the ROM 2 can be obtained, as shown in FIG. 15C, ROM correction data need not be set in an EEPROM $14_2$.

When a pattern-corrected board is obtained, the production is performed, as shown in FIG. 15C. Information indicating a circuit board 2 is stored in the EEPROM $14_2$. In this case, if the CPU incorporating the ROM 2 is obtained, ROM correction data need not be set in the EEPROM $14_2$. However, if the CPU incorporating the ROM 1 is still used, ROM correction data is written in the EEPROM $14_2$. In this case, the first external device 31 (FIG. 2) is connected to the external communication connector 15 to write ROM correction data.

FIG. 17 is a flow chart showing write discrimination of ROM correction data by the first external device 31. Note that board No. has already been written in the previous process.

The first external device 31 connected to the external communication connector 15 of the camera reads board No. and ROM No. of the CPU 11 (steps C21 and C22). In this case, if the circuit board 1 is detected, since no countermeasure can be taken (step C23), ROM correction data is not written. If the ROM 1 is detected (step C24), ROM correction data is written in the EEPROM (step C25); if the ROM 1 is not detected (ROM 2 or higher), since the ROM has already been corrected, ROM correction data is not written.

As described above, when a CPU whose ROM contents can be corrected is used, no lot management of the CPUs (ROM Nos.) and the boards is required, and when a problem is found, a countermeasure can be quickly taken.

Figure 23:
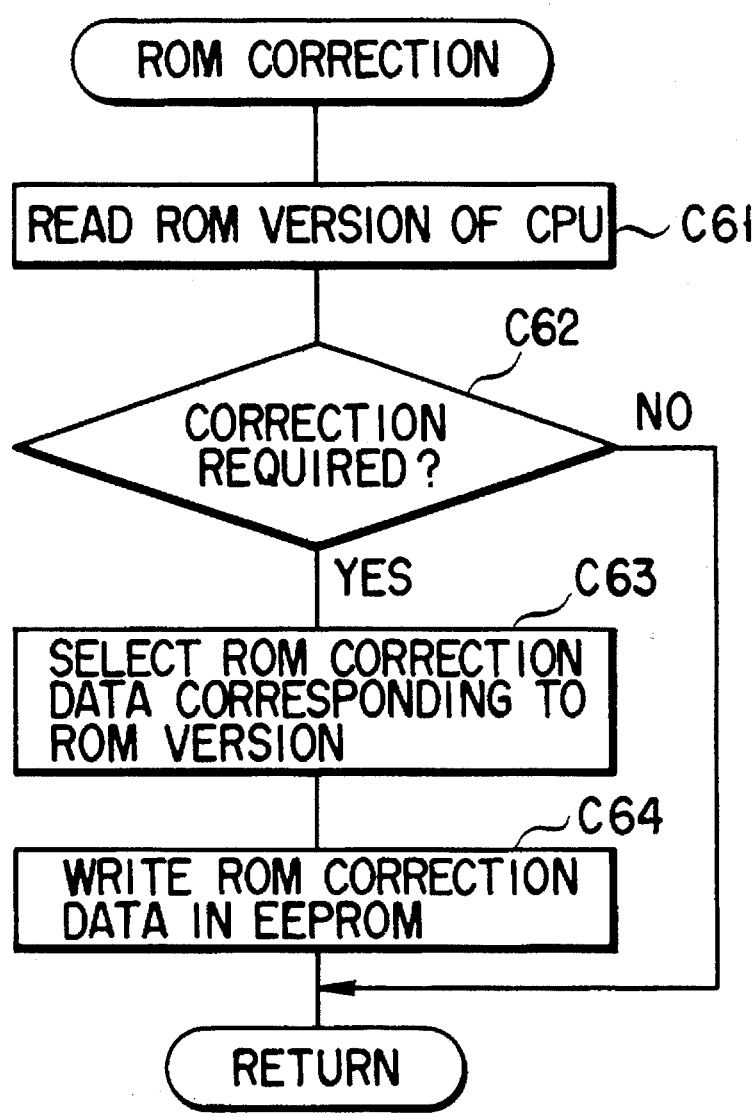
FIG. 23 is a flow chart showing another example of write discrimination processing of ROM correction data.

In FIGS. 15A to 17, a method of selecting ROM correction data based on the relationship between the board No. and the ROM version is illustrated. When a bug is detected before production/delivery, and debugging can be performed without correcting a circuit board, ROM correction data can be selected based on only the ROM version. FIG. 23 shows this example.

The ROM version of the CPU 11 is read (step C61), and it is checked based on the read ROM version if correction is necessary (step C62). If NO in step C62, the flow ends.

However, if YES in step C62, ROM correction data corresponding to the read ROM version is selected (step C63), and is written in the EEPROM 14 (step C64).

Figures 18A, 18B:
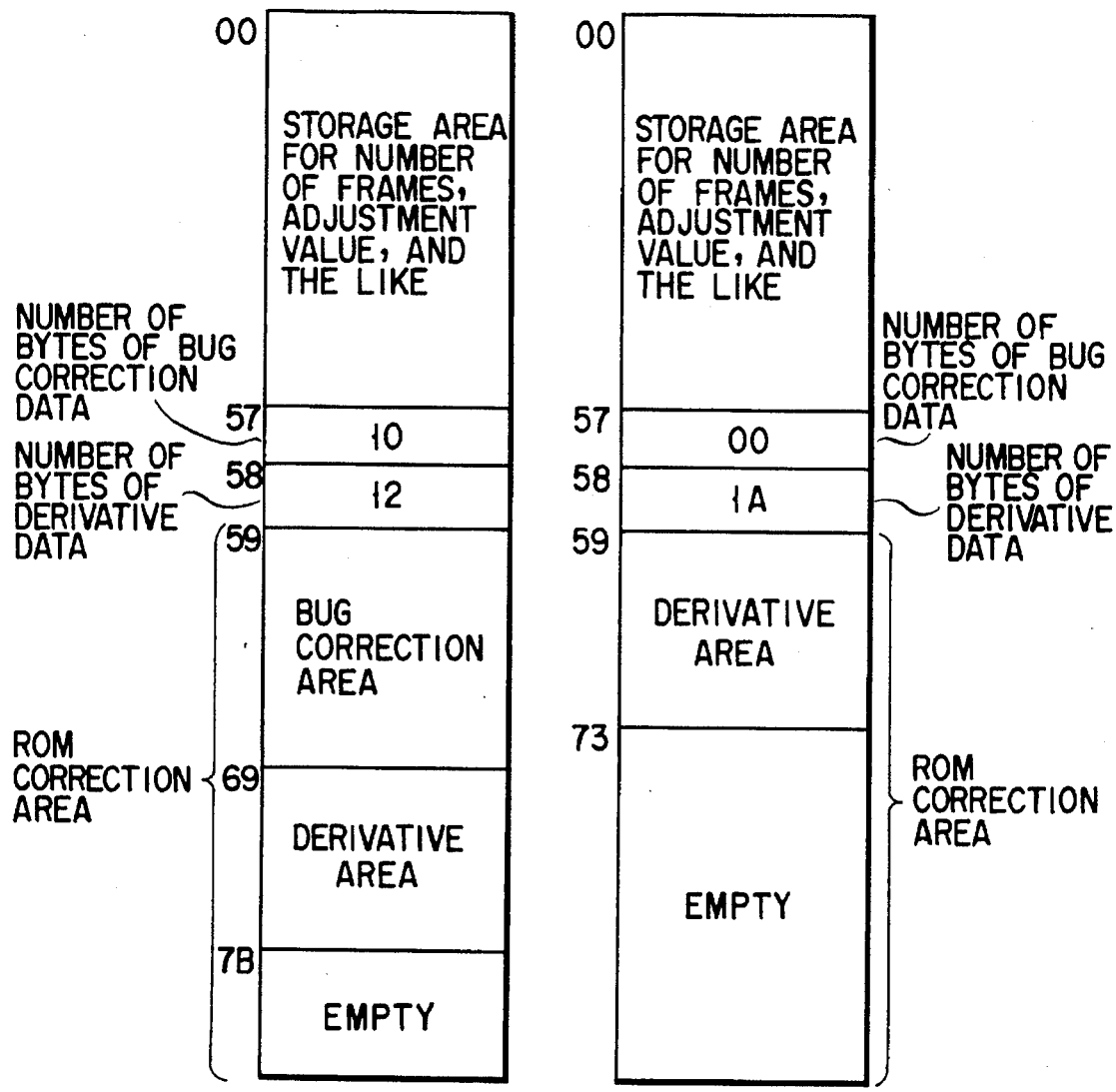
FIGS. 18A and 18B show the address maps of an EEPROM as an example of a method of storing ROM correction data for a derivative mode and bug correction.

FIGS. 18A and 18B show examples of a method of storing ROM correction data for a derivative mode and bug correction, i.e., show the address maps of the EEPROM. Addresses shown in FIGS. 18A and 18B are merely examples, and the present invention is not limited to these addresses.

FIG. 18A shows an example when both data for a derivative mode and bug correction are stored. In this example, address $57^H$ indicates the number of bytes of bug correction data, and address $58^H$ indicates that of derivative correction data.

In this example, addresses $00^H$ to $57^H$ are assigned to an area for storing the number of frames, an adjustment value, and the like of the camera system, and address $59^H$ and subsequent addresses are assigned to a ROM correction data area. In the ROM correction area, a bug correction area is allocated, and then, a derivative area is allocated. Since the number of bytes of bug correction data is $10^H$ indicated by address $57^H$, addresses $59^H$ to $68^H$ correspond to the bug correction area. Since the number of bytes of derivative data is $12^H$, addresses $69^H$ ($59^H+10^H$) to $7A^H$ correspond to the derivative area.

FIG. 18B shows an example when no bug correction data is present, and only derivative mode data is to be stored. In this case, the number of bytes of bug correction data (address $57^H$) can be set to be 0.

Although not described in the above-mentioned examples, when no derivative mode data is present, the number of bytes of derivative mode data (address $58^H$) can be set to be 0.

FIG. 19 shows a subroutine for setting ROM correction data for bug correction and a derivative mode in the CPU.

The start address ($57^H$) of the ROM correction area of the EEPROM 14 is substituted in $A_R$ (step C31). Then, a sum of the number of bytes of bug correction data and that of derivative data is substituted in N (step C32). In the case of FIG. 18A, $10^H+12^H=22^H$ is substituted in N.

$A_R+N(59^H+22^H=7B^H)$ is substituted in K (step C33). K indicates the end address of ROM correction data. Thereafter, the presence/absence of ROM correction data is checked (step C34). If NO in step C34, the flow returns to the main routine; otherwise (N=0), data is set in the ROM correction memory in the CPU 11 (step C35).

FIG. 20 shows a program used when a user wants to restore the mode from a derivative mode to a standard mode in, e.g., a repair shop. In this case, in a repair shop, data is written in the EEPROM 14 using the above-mentioned second external device 32.

Figure 22A:
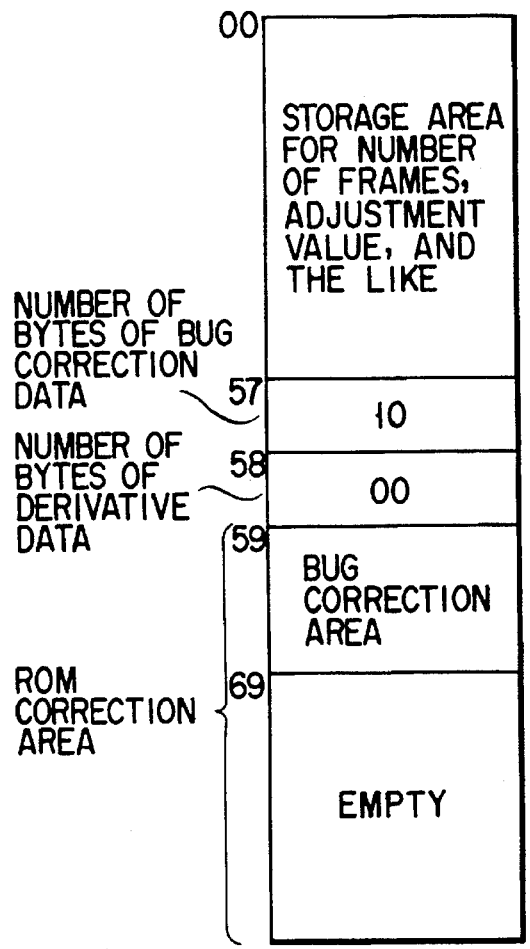
FIG. 22A shows the memory map in a state wherein a derivative mode is cleared.

In this case, this subroutine is called by a checker communication. If the number of bytes of derivative data (address $58^H$) in the EEPROM 14 is set to be "0" (step C41), it is determined that no derivative data is stored. FIG. 22A shows the memory map in a state wherein the derivative mode is cleared.

Figure 21:
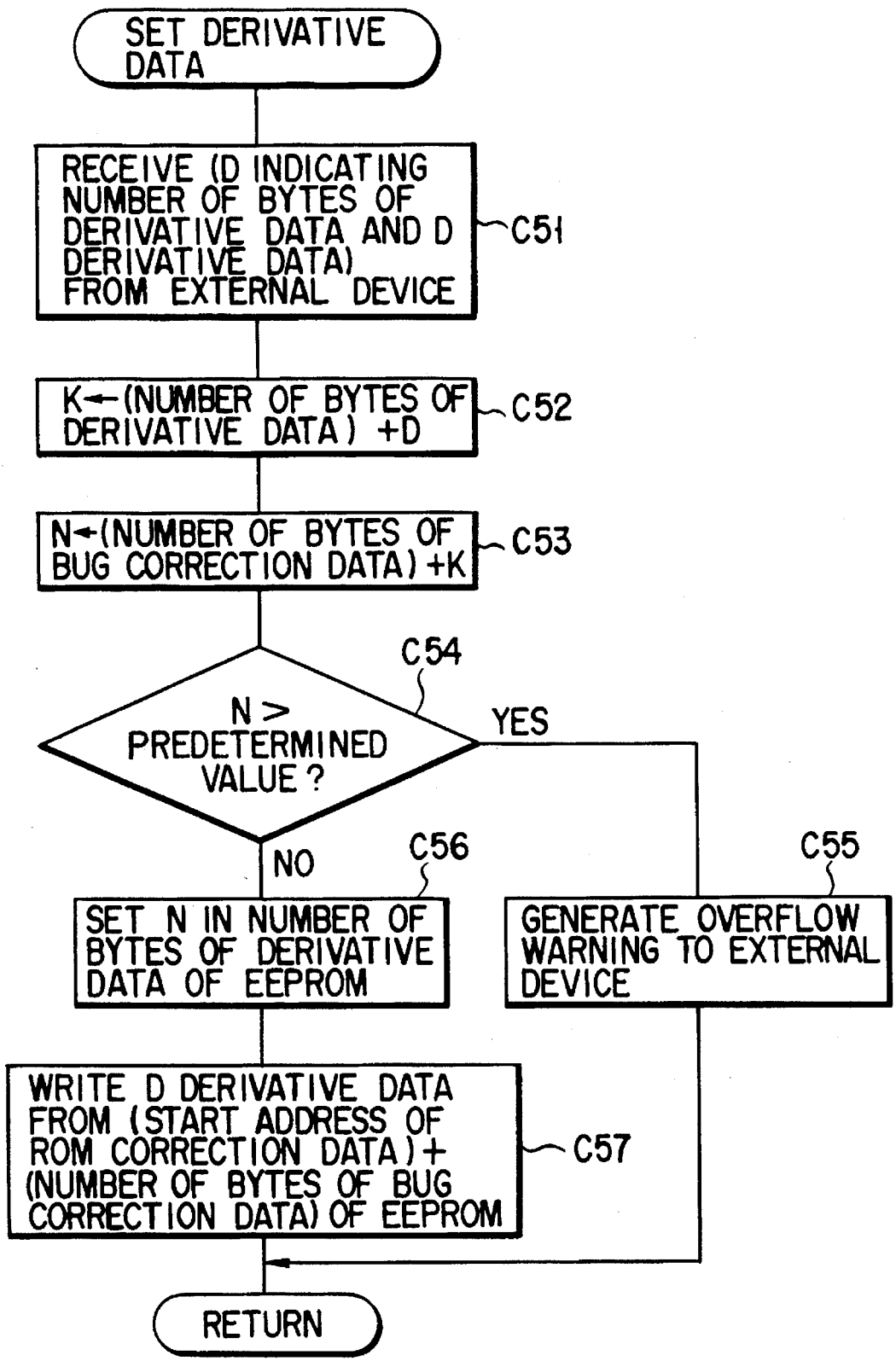
FIG. 21 is a flow chart showing a subroutine used when derivative mode data is added in, e.g., a repair shop.

FIG. 21 shows a subroutine used when derivative mode data is added in, e.g., a repair shop. In this case, data is written in the EEPROM 14 by a checker communication as in FIG. 20.

More specifically, the total number of bytes (D) of derivative data and D derivative data are received from the external device (step C51). D is added to the number of bytes of already written derivative data, and the sum is substituted in K (step C52). Thus, K indicates the updated number of bytes of derivative data.

Then, the number of bytes of bug correction data is added to K, and the sum is substituted in N (step C53). N indicates the number of bytes of the entire ROM correction area. N is compared with a predetermined value (step C54). If N is equal to or larger than the predetermined value, since the EEPROM 14 overflows, a warning is generated (step C55).

Figure 22B:
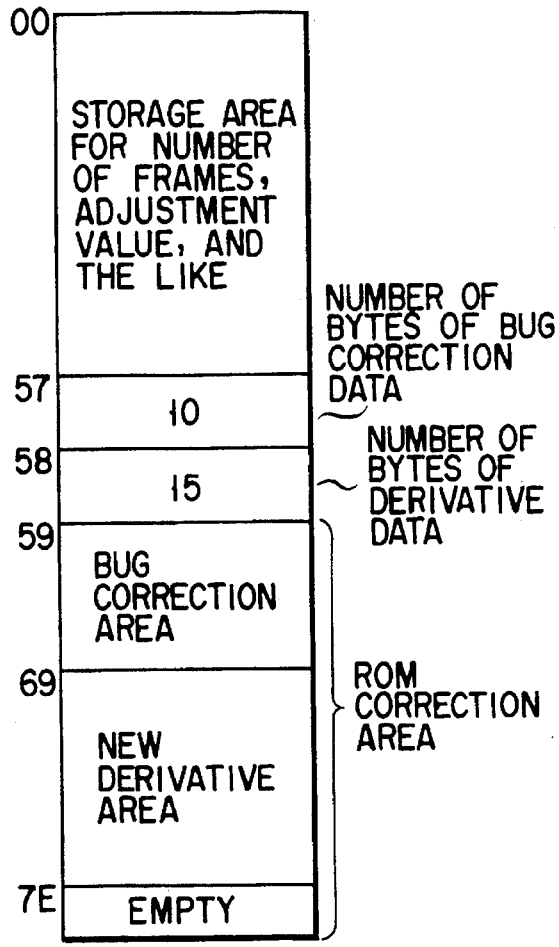
FIG. 22B shows the memory map in a state wherein a derivative mode is added.

On the other hand, if it is determined in step C54 that the EEPROM 14 does not overflow, the updated number of bytes of derivative data is set at address $58^H$ (step C56), and new derivative data are added to the EEPROM 14 (step C57). FIG. 22B shows the memory map in a state wherein the derivative data are added.

As can be understood from the above description, when a derivative mode is cleared or added, since the bug correction area is not accessed at all, bug correction data can be prevented from being erroneously corrected, and an erroneous operation of the apparatus can be avoided.

Therefore, as described above, according to the present invention, a one-chip microcomputer system which can easily and substantially correct program contents can be provided.

Also, according to the present invention, a one-chip microcomputer system in which a customer can easily delete only an optional correction area can be provided.

Furthermore, according to the present invention, a correction data write apparatus for a one-chip microcomputer system, which can automatically distinguish a microcomputer whose mask ROM is corrected from a non-corrected microcomputer, and allows easy management without being confused in a production line or a repair shop, can be provided.

Moreover, according to the present invention, a one-chip microcomputer system, which can satisfy a user's requirement for changing specifications that cannot be predicted upon system design, can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A one-chip microcomputer system comprising:
   a one-chip microcomputer including:
      a one-chip microcomputer main body,
      data input means for receiving correction data,
      a mask ROM for storing ROM version data indicating a type of said mask ROM and program contents for control by said one-chip microcomputer main body, and
      substantial changing means for substantially changing the program contents stored in said mask ROM on the basis of the correction data received via said data input means, said correction data corresponding to said ROM version data;
   an object to be controlled by said one-chip microcomputer; and
   a nonvolatile memory arranged outside said one-chip microcomputer, said nonvolatile memory having a first correction data storage area for storing the correction data for correcting a bug in the program stored in said mask ROM, and a second correction data storage area for storing correction data for adding or changing a function to said one-chip microcomputer system in accordance with a user's request;
   wherein said one-chip microcomputer reads out the ROM version data stored in said mask ROM and writes correction data matching with the readout ROM version data in said nonvolatile memory, while said one-chip microcomputer reads out the correction data written in said nonvolatile memory via said data input means and substantially changes the program contents.

2. A system according to claim 1, wherein said nonvolatile memory has an adjustment value storage area for storing an adjustment value of said one-chip microcomputer system.

3. A system according to claim 1, wherein said nonvolatile memory stores board number data indicating a version of an electrical circuit board on which said one-chip microcomputer system is mounted, and
   said one-chip microcomputer reads out the board number data stored in said nonvolatile memory in addition to the ROM version data stored in said mask ROM, and writes correction data matching with the readout ROM version data and board number data in said nonvolatile memory.

4. A system having a one-chip microcomputer capable of changing a program stored in a mask ROM upon execution of contents of the program, comprising:
   output means for outputting ROM version data indicating a type of said mask ROM and stored in said mask ROM;
   determination means for determining on the basis of the ROM version data whether or not correction of the program contents stored in said mask ROM is required; and
   means for, when said determination means determines that the correction is required, providing a correction program, said correction program corresponding to said ROM version data.

5. A system according to claim 4, wherein the correction program is stored in a nonvolatile memory connected to said one-chip microcomputer.

6. A one-chip microcomputer system comprising:
   a one-chip microcomputer including:
      a one-chip microcomputer main body including a mask ROM storing at least ROM version data indicating a type of said mask ROM,
      data input means for receiving correction data, and
      substantial changing means for substantially changing program contents used for control by said one-chip microcomputer main body and stored in said mask ROM on the basis of the correction data received via said data input means;
   an object to be controlled by said one-chip microcomputer; and
   a nonvolatile memory arranged outside said one-chip microcomputer, said nonvolatile memory having an adjustment value storage area for storing an adjustment value of said system, a first correction data storage area for storing the correction data for correcting a bug in the program stored in said mask ROM and a second correction data storage area for storing correction data for adding or changing a function to said system in accordance with a user's request, said correction data matching with the ROM version data being stored in said first correction data storage area,
   wherein said one-chip microcomputer reads out the ROM version data stored in said mask ROM and writes correction data matching with the readout ROM version data stored in said nonvolatile memory, while said one chip microcomputer also reads out the correction data written in said nonvolatile memory via said data input means, and substantially changes the program contents.

7. A microcomputer system comprising:
   a one-chip microcomputer having a function of substantially changing program contents stored in a mask ROM;
   an electrically rewritable nonvolatile memory which is connected to said one-chip microcomputer, and can store correction data for substantially correcting the program stored in said mask ROM, said nonvolatile memory having at least first and second correction data areas, said correction data corresponding to a ROM version data stored in said mask ROM;
   a connection terminal for inputting the correction data from a device outside said microcomputer system to at least one of said one-chip microcomputer and said nonvolatile memory; and
   an external device which can be connected to said connection terminal,
   wherein only the correction data stored in the second correction data area can be changed by said external device.

8. A system according to claim 7, wherein the first correction data area stores correction data for preventing an erroneous operation of said microcomputer system, and the second correction data area stores derivative correction data for adding or changing a function of said microcomputer system.

* * * * *